US011204764B2

(12) United States Patent
Jha

(10) Patent No.: US 11,204,764 B2
(45) Date of Patent: Dec. 21, 2021

(54) PROCESSORS, METHODS, SYSTEMS, AND INSTRUCTIONS TO PARTITION A SOURCE PACKED DATA INTO LANES

(71) Applicant: Intel Corporation, Santa Clara, CA (US)

(72) Inventor: Ashish Jha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/087,231

(22) Filed: Mar. 31, 2016

(65) Prior Publication Data
US 2017/0286109 A1 Oct. 5, 2017

(51) Int. Cl.
*G06F 9/315* (2018.01)
*G06F 9/30* (2018.01)

(52) U.S. Cl.
CPC ...... *G06F 9/30043* (2013.01); *G06F 9/30018* (2013.01); *G06F 9/30032* (2013.01); *G06F 9/30036* (2013.01)

(58) Field of Classification Search
CPC ............ G06F 9/30032; G06F 9/30036; G06F 9/30043; G06F 9/30018
See application file for complete search history.

(56) References Cited

U.S. PATENT DOCUMENTS

| | | | | |
|---|---|---|---|---|
| 4,141,005 A | * | 2/1979 | Bonner | G06F 9/30036 341/60 |
| 5,983,336 A | * | 11/1999 | Sakhin | G06F 9/30072 712/1 |
| 6,356,993 B1 | * | 3/2002 | Jackson | G06F 15/17337 712/11 |
| 6,453,405 B1 | * | 9/2002 | Hoyle | G06F 9/30036 711/110 |

(Continued)

FOREIGN PATENT DOCUMENTS

TW 201439770 A 10/2014

OTHER PUBLICATIONS

Freescale Semiconductor, "AltiVec Technology Programming Interface Manual", Jun. 1999, 5 pages.*

(Continued)

*Primary Examiner* — David J. Huisman
(74) *Attorney, Agent, or Firm* — NDWE, LLP

(57) ABSTRACT

A processor includes a decode unit to decode an instruction that is to indicate a source packed data that is to include a plurality of adjoining data elements, a number of adjoining data elements, and a destination. The processor also includes an execution unit coupled with the decode unit. The execution unit, in response to the instruction, is to store a result packed data in the destination. The result packed data is to have a plurality of lanes that are each to store a different non-overlapping set of the indicated number of adjoining data elements aligned with a least significant end of the (Continued)

respective lane. The different non-overlapping sets of the indicated number of the adjoining data elements in adjoining lanes of the result packed data are to be separated from one another by at least one most significant data element position of the less significant lane of the adjoining lanes.

24 Claims, 23 Drawing Sheets

(56) References Cited

U.S. PATENT DOCUMENTS

| | | | | |
|---|---|---|---|---|
| 7,529,918 | B2* | 5/2009 | Taunton | G06F 9/30018 712/220 |
| 2004/0133617 | A1* | 7/2004 | Chen | G06F 9/30014 708/523 |
| 2005/0198473 | A1* | 9/2005 | Ford | G06F 7/76 712/221 |
| 2007/0239810 | A1 | 10/2007 | Lin et al. | |
| 2013/0124835 | A1 | 5/2013 | Peleg et al. | |
| 2013/0212360 | A1 | 8/2013 | Sperber et al. | |
| 2014/0095828 | A1* | 4/2014 | Plotnikov | G06F 9/3885 712/5 |
| 2014/0189321 | A1 | 7/2014 | Uliel et al. | |
| 2015/0006858 | A1 | 1/2015 | Toll et al. | |
| 2015/0082010 | A1* | 3/2015 | Martin | G06F 9/30018 712/225 |
| 2016/0126975 | A1* | 5/2016 | Lutz | G06F 7/483 708/204 |

OTHER PUBLICATIONS

Intel, "IA-64 Application Developer's Architecture Guide", May 1999, pp. 7-183 and C-21.*
International Search Report and Written Opinion received for PCT Patent Application No. PCT/US2017/020198, dated May 26, 2017, 13 pages.
International Preliminary Reporton Patentability for Application No. PCT/US2017/020198, dated Oct. 11, 2018, 8 pages.
Intel, "Intel Advanced Vector Extensions Programming Reference", Document reference No. 319433-011, Jun. 2011, 595 pages.
Intel, "Intel 64 and IA-32 Architectures Software Developer's Manual, Combined vols. 1, 2A, 2B, 2C, 3A, 3B, and 3C", Document Reference No. 325462-040US, Oct. 2011, 4181 pages.
Intel, "Intel Advanced Vector Extensions Programming Reference," Document reference No. 319433-011, Jun. 2011, Chapters 1, 4, 5 and 7, 100 pages.
Intel, "Intel 64 and IA-32 Architectures Software Developer's Manual" Document reference No. 253665-040US, Oct. 2011, vol. 1, Chapters 4, 5, 9, 10, 11, 12, 13, 238 pages.
Intel, "Intel 64 and IA-32 Architectures Software Developer's Manual", Document reference No. 253665-040US, Oct. 2011, vol. 2A, 2B, Chapters 3 and 4, 81 pages.
Office Action and Search Report, TW App. No. 106105977, dated Jul. 30, 2021, 15 pages (8 pages of English Translation and 7 pages of Original Document).
Allowance Decision of Examination, TW App. No. 106105977, dated Aug. 26, 2021, 3 pages (1 page of English Translation and 2 pages of Original Document).

* cited by examiner

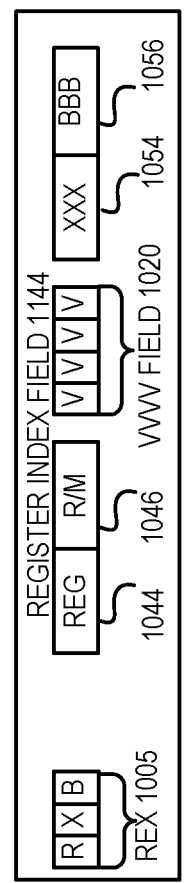
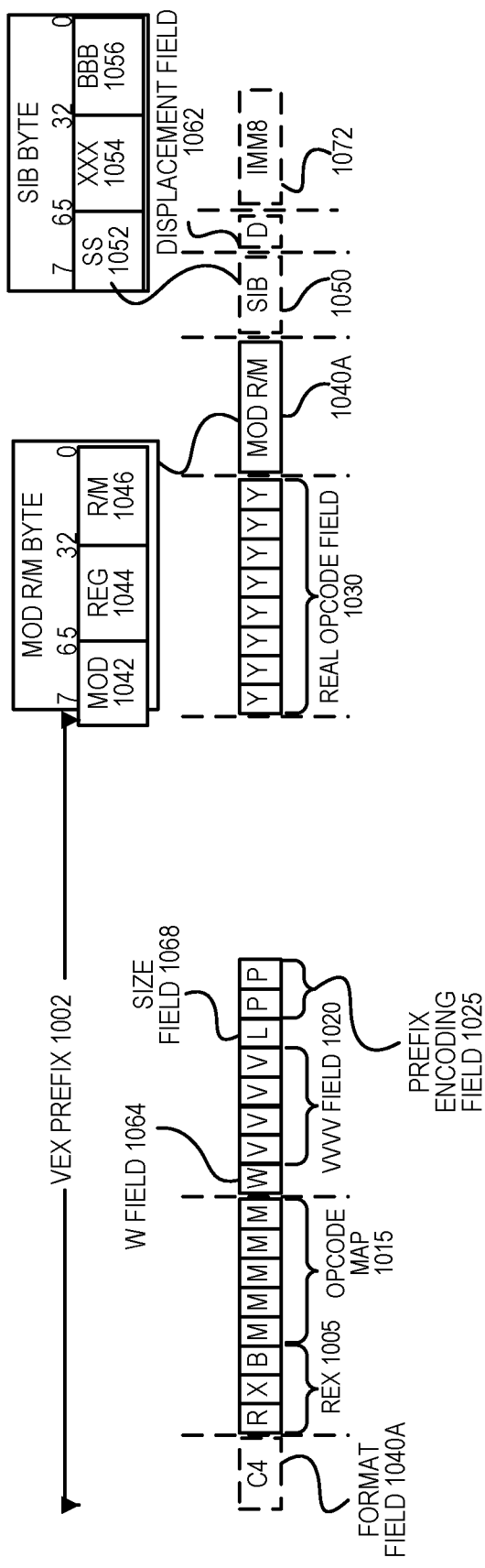
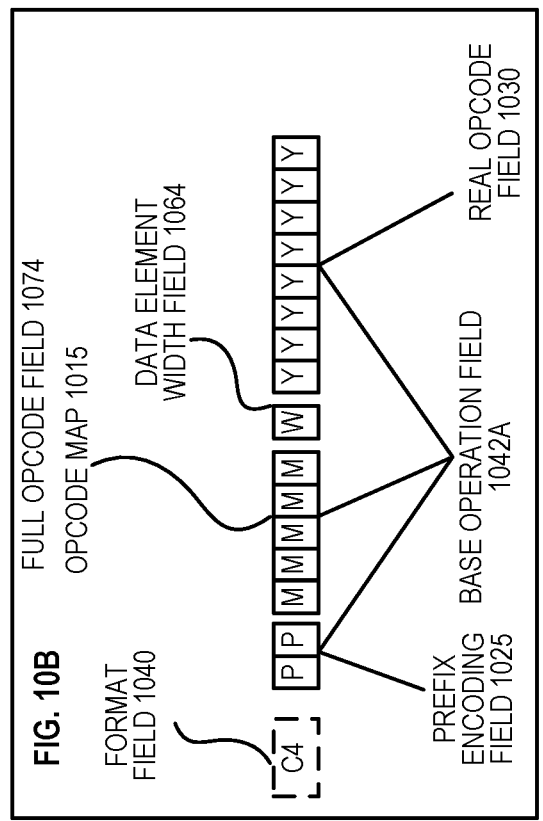

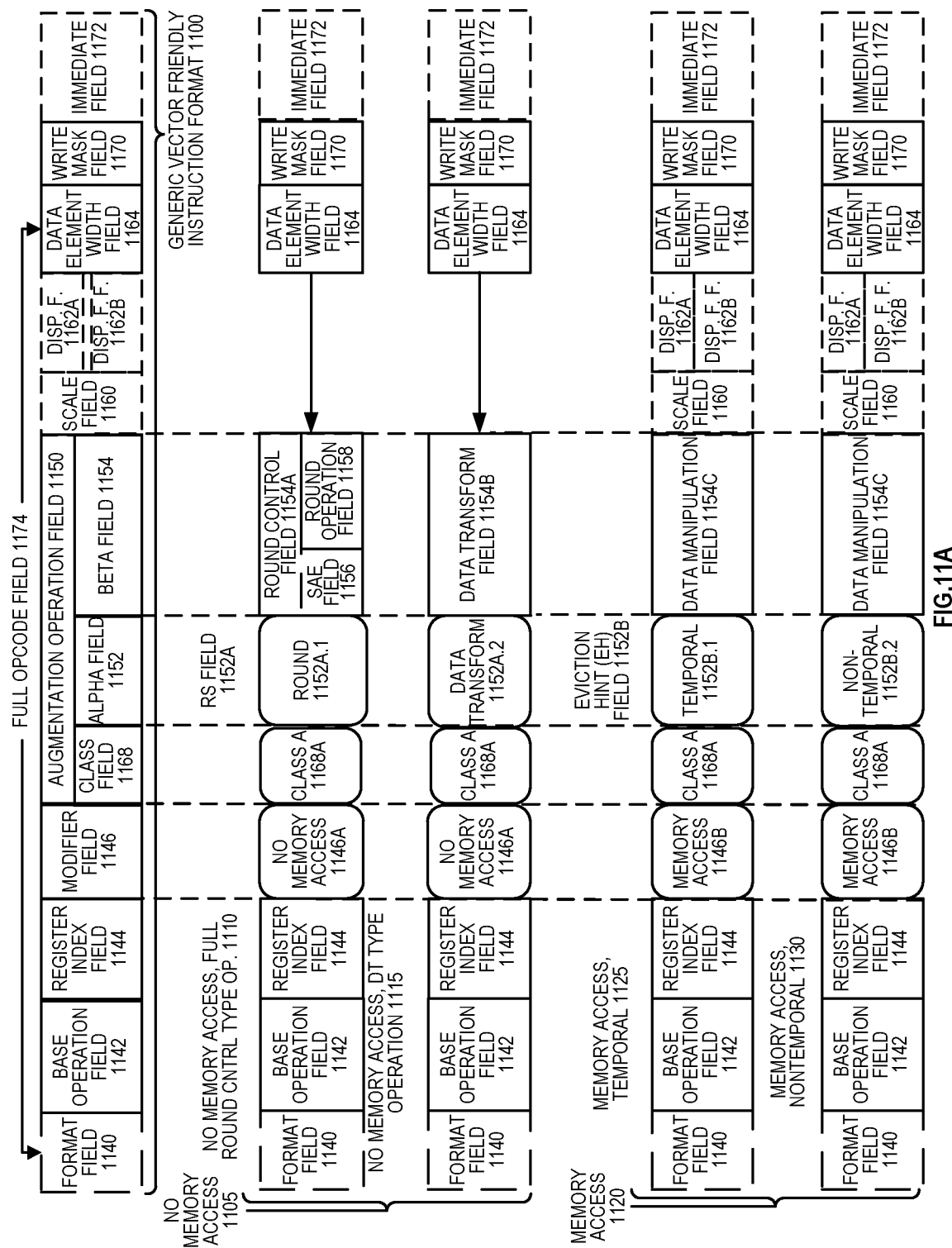

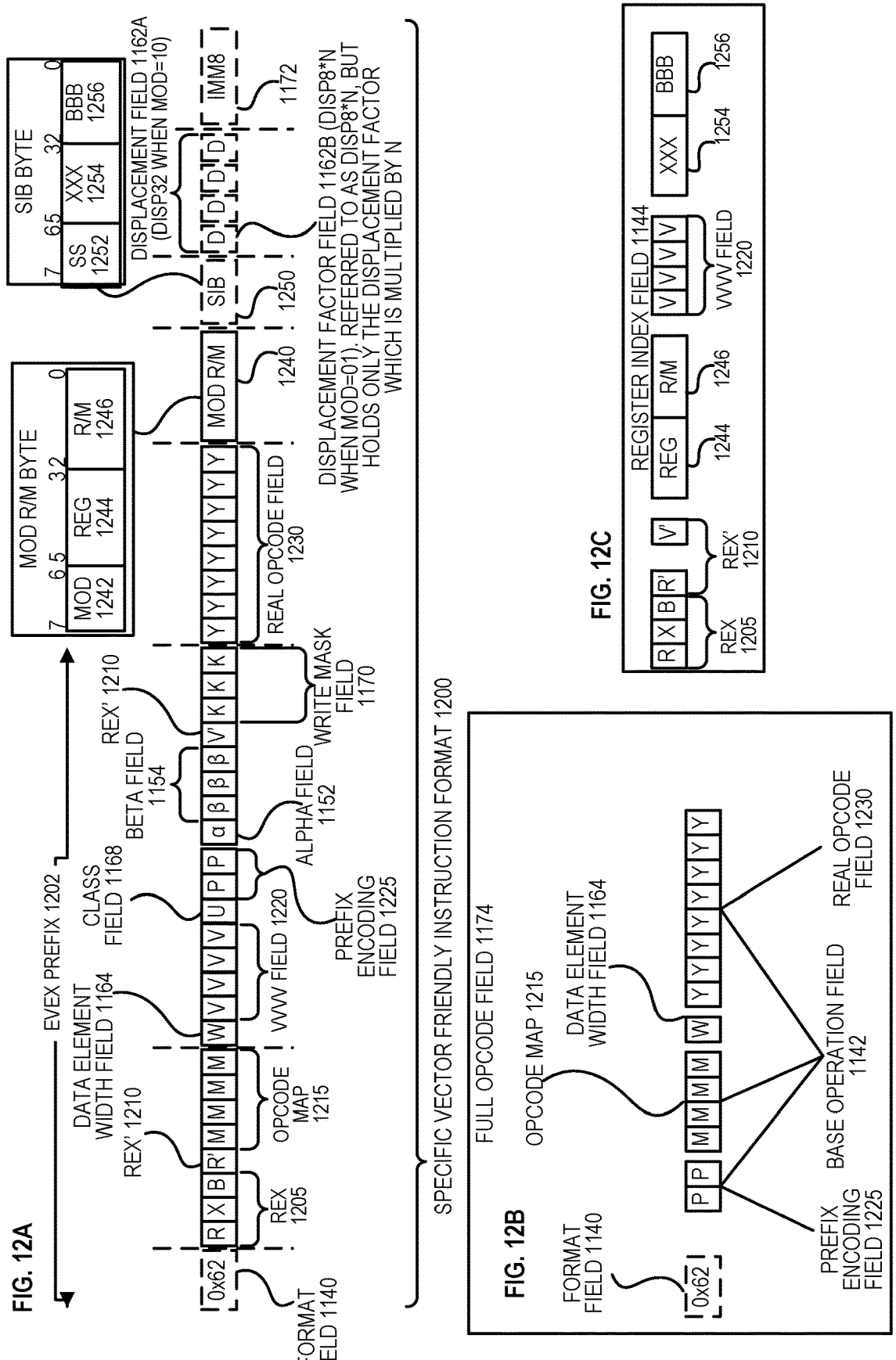

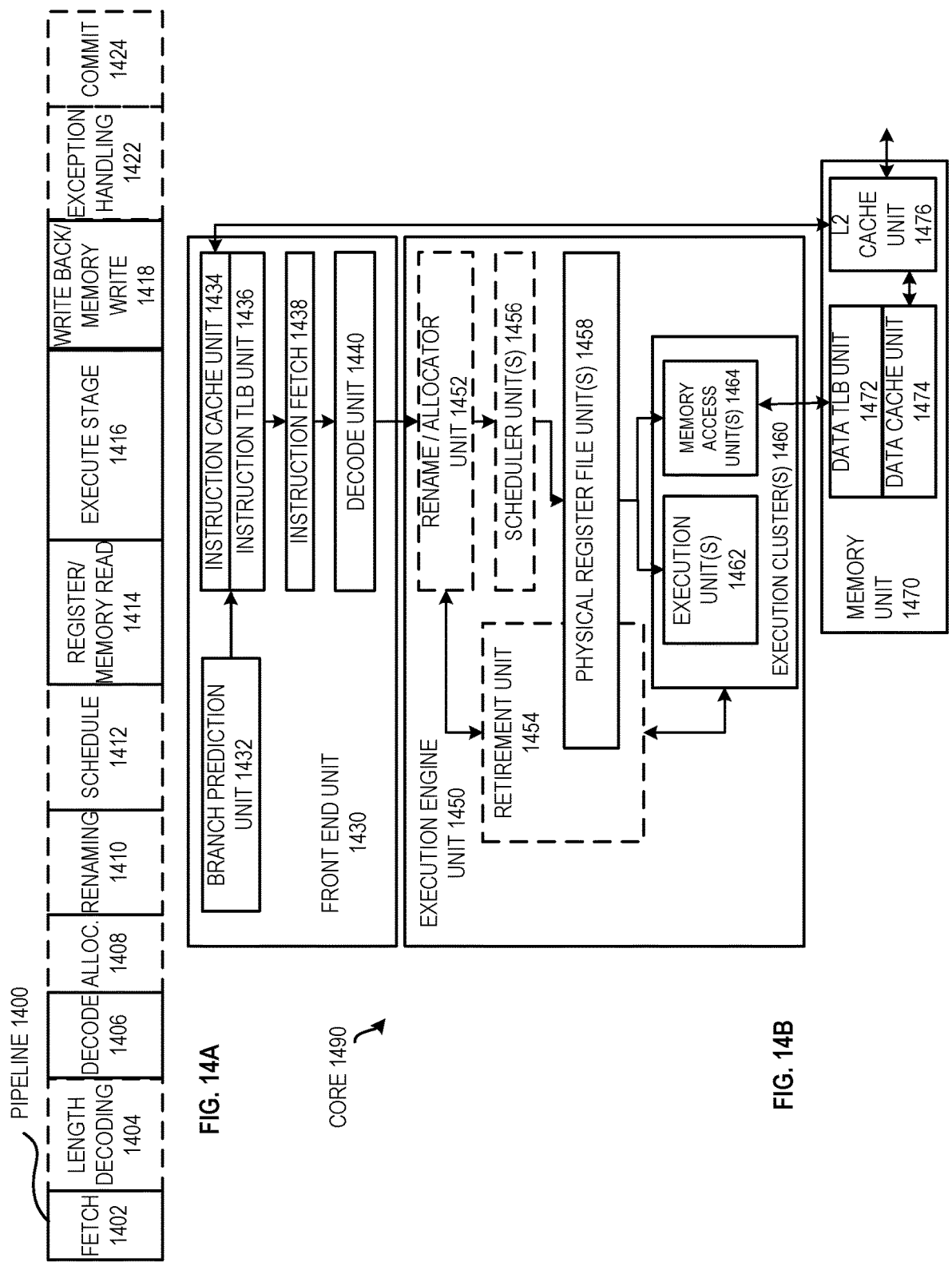

PROCESSORS, METHODS, SYSTEMS, AND INSTRUCTIONS TO PARTITION A SOURCE PACKED DATA INTO LANES

BACKGROUND

Technical Field

Embodiments described herein generally relate to processors. In particular, embodiments described herein generally relate to processors to operate on packed data in response to instructions.

Background Information

Many processors have Single Instruction, Multiple Data (SIMD) architectures. In SIMD architectures, multiple data elements may be packed within one register or memory location as packed data or vector data. In packed or vector data, the bits of the register or memory location may be logically divided into a sequence of data elements. For example, a 128-bit wide packed data register may have two 64-bit data elements, four 32-bit data elements, eight 16-bit data elements, or sixteen 8-bit data elements. Each of the data elements may represent a separate piece of data (e.g., a pixel color component, a floating point number, etc.) that may be operated upon separately and/or independently of the others.

In such SIMD architectures, a packed data instruction, vector instruction, or SIMD instruction may be used to operate on multiple data elements of such a packed data or vector operand, or multiple pairs of data elements of two such packed data or vector operands, simultaneously and/or in parallel. The processor may have parallel execution hardware responsive to the instruction to operate on the data simultaneously and/or in parallel.

BRIEF DESCRIPTION OF THE DRAWINGS

The invention may best be understood by referring to the following description and accompanying drawings that are used to illustrate embodiments. In the drawings:

FIGS. 10A-10C are block diagrams illustrating a generic vector friendly instruction format and instruction templates thereof, according to embodiments of the invention.

FIG. 11A-B is a block diagram illustrating an exemplary specific vector friendly instruction format and an opcode field, according to embodiments of the invention.

FIG. 12A-D is a block diagram illustrating an exemplary specific vector friendly instruction format and fields thereof, according to embodiments of the invention.

FIG. 14A is a block diagram illustrating an embodiment of an in-order pipeline and an embodiment of a register renaming out-of-order issue/execution pipeline.

FIG. 14B is a block diagram of an embodiment of processor core including a front end unit coupled to an execution engine unit and both coupled to a memory unit.

DETAILED DESCRIPTION OF EMBODIMENTS

Disclosed herein are partition into lanes instructions, processors to perform the instructions, methods performed by the processors when processing or performing the instructions, and systems incorporating one or more processors to process or perform the instructions. In some embodiments, the processors may have a decode unit or other logic to receive and/or decode the instructions, and an execution unit or other logic to execute or otherwise perform the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
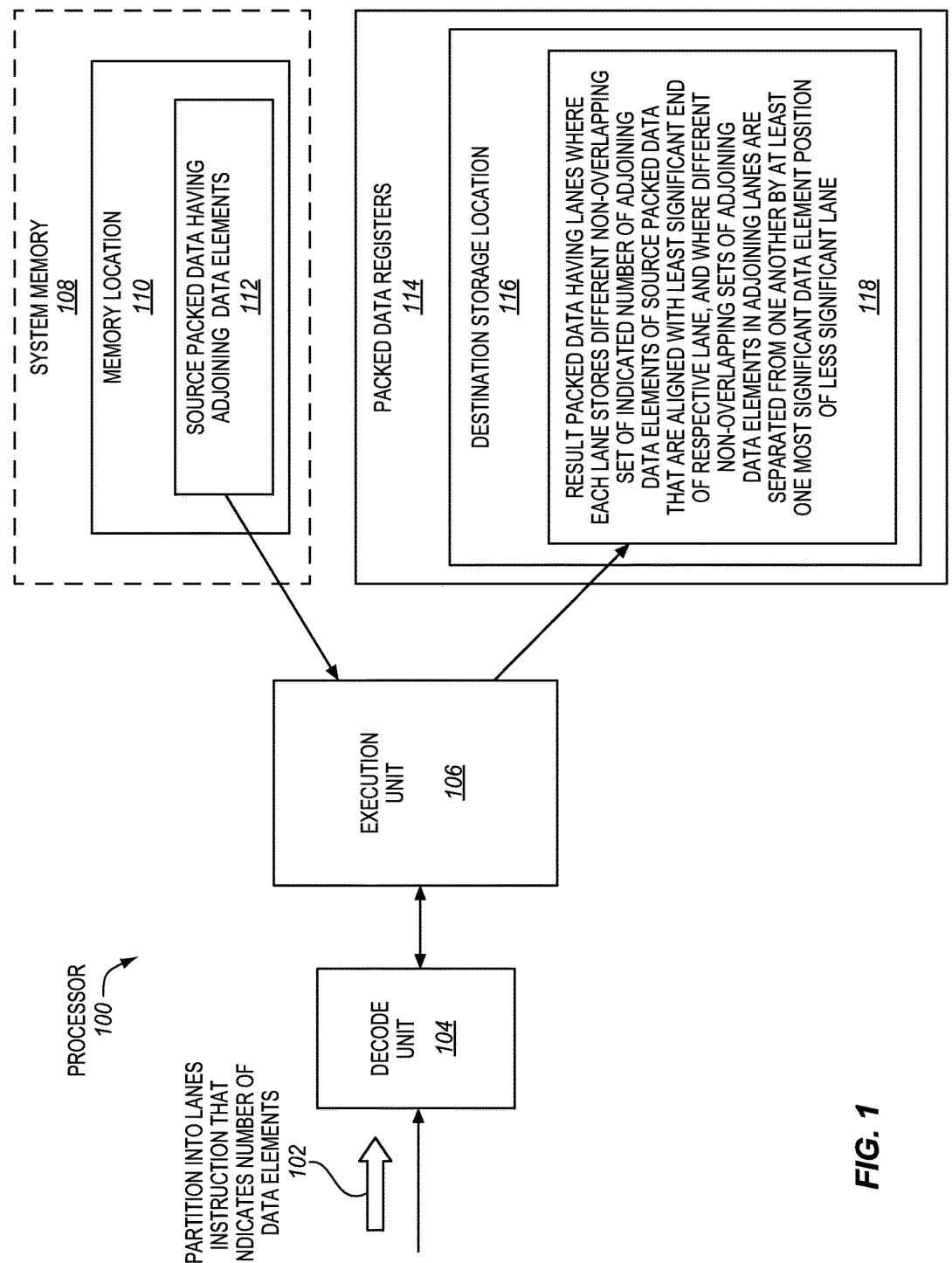
FIG. 1 is a block diagram of an embodiment of a processor that is operative to perform an embodiment of a partition into lanes instruction.

FIG. 1 is a block diagram of an embodiment of a processor 100 that is operative to perform an embodiment of a partition into lanes instruction 102. In some embodiments, the processor may represent an integrated circuit and/or may include integrated circuitry or logic disposed on a semiconductor die. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 100 may receive the partition into lanes instruction 102. For example, the instruction may be received from memory over a bus or other interconnect. The instruction may represent a macroinstruction, machine code instruction, or other instruction or control signal of an instruction set of the processor. In some embodiments, the partition into lanes instruction may explicitly specify (e.g., through one or more fields or a set of bits), or otherwise indicate (e.g., implicitly indicate), a source packed data 112 that is to include a plurality of adjoining data elements, and may explicitly specify or otherwise indicate a destination storage location 116 (e.g., a destination packed data register) where a result packed data 118 is to be stored in response to the instruction.

As shown, in some embodiments, the source packed data 112 may optionally be stored in system memory 108. In such embodiments, the instruction may specify or otherwise indicate memory address information to be used to address a memory location 110 where the source packed data is to be stored. Various different types of address information are possible. The address information may either represent absolute memory address information or relative memory address information, which may indicate a memory location relative to a base memory address or other memory location. In addition, various different indirect memory addressing modes may optionally be used. As one specific example, the fetch instruction may implicitly indicate a register (e.g., a general-purpose register) that is used to store relative memory address information that may be combined with additional memory address information stored in another implicit register (e.g., a code, data, or extended segment register) to generate the final memory address used to identify the memory location where the source packed data is to be stored. The implicitly indicated register may be understood by the processor although unexpressed through an explicit value. For example, the processor may understand or recognize after identifying an opcode of the instruction that it is inherent or implicit to use the register(s). This is just one example. Other forms of the address information are also possible. Also, rather than the address information being provided in one or more registers, potentially some or all of the address information may be provided by bits of the instruction (e.g., an immediate).

In other embodiments, the source packed data 112 may optionally be stored in one of the packed data registers 114 of the processor. As further shown, in some embodiments, the destination storage location may optionally be one of the packed data registers 114 of the processor, although this is not required. In other embodiments, other storage locations may optionally instead be used for one or more of these operands. The instruction may have source and/or destination operand specification fields to specify packed data registers, memory locations, or other storage locations for such operands. Alternatively, one or more of these storage locations may optionally be implicit to the instruction (e.g., implicit to an opcode of the instruction) instead of being explicitly specified. Moreover, in some embodiments, a packed data register or other storage location used for the source packed data may optionally be implicitly reused as a destination storage location for the result packed data, and may be specified only once. In one aspect, a source/destination packed data register may be implicitly or impliedly understood to be used for both the source operand and the result operand.

In various embodiments, the data elements of the source packed data may be 8-bit data elements, 16-bit data elements, 32-bit data elements, or 64-bit data elements. The data elements may be integer, fixed point, or floating point. In some embodiments, the data elements may optionally be floating point data elements, such as, for example, 32-bit single precision floating point data elements or 64-bit double precision floating point data elements, although the scope of the invention is not so limited. The data elements of the source packed data are adjoining data elements in that the data elements are contiguous and/or conterminous and/or that there may be no extra intervening data elements or bits between the adjoining data elements. For example, the most significant bit of the less significant data element in each pair of adjoining data elements may be one bit less than the least significant bit of the more significant data element in each pair of adjoining data elements.

In some embodiments, the instruction may also indicate a number of data elements, which may be used to partition, split, or divide the source packed data. For example, the instruction may indicate the number of data elements as two data elements, three data elements, six data elements, or some other number of data elements, to indicate the point or points where the source packed data is to be partitioned, split, or divided into equal sized non-overlapping segments or portions of data elements. The instruction may indicate the number of data elements in different ways in different embodiments. In some embodiments, the instruction may have an immediate (e.g., a two, four, six, or eight bit immediate) or other field to have a value to specify or otherwise indicate the actual number of data elements. In other embodiments, the instruction may have an immediate or other field to have a value to specify or otherwise indicate a number of multiple data element structures (e.g., a number of two element structures or three elements structures) to thereby indirectly indicate the actual number of data elements.

Referring again to FIG. 1, the processor includes a decode unit or decoder 104. The decode unit may receive and decode the partition into lanes instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level partition into lanes instruction. In some embodiments, the decode unit may include one or more input structures (e.g., port(s), interconnect(s), an interface) to receive the partition into lanes instruction, an instruction recognition and decode logic coupled therewith to recognize and decode the partition into lanes instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die of the processor.

In some embodiments, instead of the partition into lanes instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the partition into lanes instruction, which may be of a first instruction set, and may emulate, translate, morph, interpret, or otherwise convert the partition into lanes instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

The processor 100 also includes the set of packed data registers 114. Each of the packed data registers may represent an on-die storage location that is operative to store packed data, vector data, or SIMD data. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures and are not limited to any particular type of design. Examples of suitable types of registers include, but are not limited to, dedicated physical registers, dynamically allocated physical registers using register renaming, and combinations thereof.

Referring again to FIG. 1, the execution unit 106 is coupled with the decode unit 104 and is coupled with the packed data registers 114. In some embodiments, the execution unit may be on-die with the decode unit. During operation, if the source packed data is in memory, the execution unit may be coupled with the memory in order to receive the source packed data. The execution unit may be coupled with these components through other intervening components (not shown). The execution unit may receive the one or more decoded or otherwise converted instructions or control signals that represent and/or are derived from the partition into lanes instruction. The execution unit may also receive the source packed data 112. The execution unit may be operative in response to and/or as a result of the partition into lanes instruction (e.g., in response to one or more instructions or control signals decoded from the instruction) to store the result packed data 118 in the destination storage location (e.g., a destination packed data register) indicated by the instruction.

In some embodiments, the result packed data 118 and/or the destination storage location may have a plurality of lanes. In various embodiments, the lanes of the result packed data and/or the destination storage location may be 64-bit lanes, 128-bit lanes, 256-bit lanes, or 512-bit lanes, although the scope of the invention is not so limited. In some embodiments, the lanes may have a same size as a size of an architectural packed data register of the processor. In some embodiments, the lanes may be half, or one quarter, the size of the largest architectural packed data registers of the processor. In some embodiments, each of the lanes may be large enough to store a plurality of 32-bit data elements, or may be large enough to store a plurality of 64-bit data elements. In some embodiments, the partition into lanes instruction may optionally have one or more bits or a field to indicate a size of the lanes. For example, a single bit may indicate a size of a lane as being either 128-bits or 256-bits, or two bits may be used to indicate up to four different lane sizes. Alternatively, the size of the lane may optionally be implicit to the instruction (e.g., implicit to an opcode).

In some embodiments, each of the lanes of the result packed data and/or destination storage location may store a different non-overlapping set of the indicated number (i.e., the number indicated by the instruction) of adjoining data elements of the source packed data. In other words, each lane may store a different non-overlapping same sized portion of the source packed data. Each of these different non-overlapping sets of (the indicated number of) adjoining data elements (or different non-overlapping same sized portions of the source packed data) may be aligned with a least significant end of the respective lanes in which they are stored. In some embodiments, the different non-overlapping sets of (the indicated number of) the adjoining data elements (or different non-overlapping same sized portions of the source packed data) that are stored in adjoining lanes of the result packed data (or destination storage location) may be separated from one another by at least one most significant data element position of the less significant lane. For example, a second non-overlapping same sized portion of the source packed data that is stored in a next-to-least significant lane of the result packed data may be separated from a first non-overlapping same sized portion of the source packed data that is stored in a least significant lane of the result packed data by at least one most significant data element position of the least significant lane which is not used to store either of these two non-overlapping same sized portions of the source packed data. Rather, zeroes, existing values, or some other values may be stored in these positions. In some embodiments, the result packed data may be any of those shown and described for FIGS. 3-7, although the scope of the invention is not so limited.

In the source packed data, all of the data elements that are to be stored to the result packed data may be adjoining or contiguous. In the case of the source packed data being in memory, the execution unit and/or the processor, in response to the instruction, may be operative to load each of the data elements of the source packed data (or at least those that are to be stored to the result packed data) from the system memory by performing a single load operation. The execution unit, in response to the instruction, may split or partition the data elements of the source packed data into the multiple non-overlapping segments or portions of contiguous data elements, and then distribute or apportion each of these different segments or portions to a different corresponding lane. This may be useful for various different purposes. For example, it may be easier or more convenient from an overall the different data element segments or portions of the source packed data if they are split and aligned along lane boundaries.

Advantageously, the partition source packed data into lanes instruction 102 may allow the source packed data 112 to be split into two or more portions and have those portions aligned along respective lane boundaries within the confines of the performance of a single instruction. In addition, in some embodiments where the source packed data is initially stored in memory (which is not required), the instruction may allow each of the portions to be loaded from memory with a single load operation (e.g., use of a single load port once) also within the confines of performing the same single instruction. Another possible approach would be to perform multiple instructions to mimic this operation. As one illustrative example, a first instruction may be performed to load a first segment or portion from memory into a first packed data register, and then a second instruction may be performed to load a second segment or portion from the memory, with broadcasting of the loaded data into both an upper and lower lane of a second packed data register, and with masking (e.g., using a mask in a mask register) to mask out the lower lane of the second packed data register and merge the first and second packed data registers. However, one possible drawback to such an alternate approach is that two loads are used, instead of just a single load. This may tend to unnecessarily consume load ports and other resources and/or reduce performance. Additionally, two instructions are performed, instead of just a single instruction, which may also tend to reduce performance and/or increase power consumption. Also, multiple packed data registers and a mask register are used, instead of just a single destination packed data register. Such registers generally tend to be somewhat scarce resources which could instead be used for other purposes.

In some embodiments, it may be implicit to the instruction and/or fixed for the instruction (e.g., implicit to an opcode of the instruction or fixed for the opcode of the instruction) to split the source operand into multiple non-overlapping portions and align each of the different non-overlapping portions with the least significant ends of the respective lanes. This may be implicitly or impliedly understood by the processor, although not explicitly unexpressed other than through the opcode and any opcode related bits. For example, the processor may understand or recognize after identifying an opcode of the instruction that such an operation is inherent or implicit. An alternate possible approach would be to use a flexible instruction, such as a shuffle or permute instruction having a set of shuffle or permute control bits to control flexible shuffling or permutation of source data elements into flexible positions in the destination according to the control bits. The shuffle or permute instruction may be used to shuffle or permute data elements from one or more source packed data, to different data element positions in a result packed data, according to corresponding the shuffle or permute control bits for each data element that is shuffled or permuted. These sets of shuffle or permute control bits may be provided in an immediate of the instruction, or in another source operand generally stored in a register, for example. However, there are potential drawbacks with such an alternate approach of using such flexible shuffle or permute instructions, at least for certain applications. For one thing, it generally takes extra time and/or effort to generate the sets of shuffle or permute control bits. For example, either a programmer may need to generate these explicitly, or a compiler may need to generate them through additional workload on the compiler. In addition, storing the shuffle or permute control bits in a register may tie up the register and prevent it from being used for another purpose. Further, when the instruction has an additional field to specify a register to store the shuffle or permute control bits, or when the shuffle or permute control bits are provided by an immediate of the instruction, the length of the instruction may be increased. This may tend to reduce the number of instructions that can be fetched in an instruction bundle and/or increase the complexity of decoding the instruction and/or the time needed to decode the instruction, which may tend to reduce front end throughput. Also, this may tend to increase code size. In addition, in the case of an immediate, generally only a certain number of control bits are able to fit within the immediate, which may limit the number of data elements that can be shuffled or permuted.

The execution unit and/or the processor may include specific or particular logic (e.g., transistors, integrated circuitry, or other hardware potentially combined with firmware (e.g., instructions stored in non-volatile memory) and/or software) that is operative to perform the partition into lanes instruction and/or store the result packed data in response to and/or as a result of the partition into lanes instruction (e.g., in response to one or more instructions or control signals decoded from the partition into lanes instruction). In some embodiments, the execution unit may include one or more input structures (e.g., port(s), interconnect(s), an interface) to receive the source packed data, logic coupled therewith to split the source packed data into portions each having the indicated number of data elements, and one or more output structures (e.g., port(s), interconnect(s), an interface) coupled therewith to distribute, apportion, or otherwise output these portions to the corresponding different lanes of the result packed data and/or destination storage location.

To avoid obscuring the description, a relatively simple processor 100 has been shown and described. However, the processor may optionally include other processor components. For example, various different embodiments may include various different combinations and configurations of the components shown and described for any of FIGS. 13, 14A/B, 15A/B, 16. By way of example, considering FIG. 14B, the instruction fetch unit 1438 may fetch the instruction, the decode unit 1440 may decode the instruction, the scheduler unit 1456 may schedule the associated operations, the retirement unit 1454 may retire the instruction, etc. All of the components of the processor may be coupled together to allow them to operate as intended.

Figure 2:
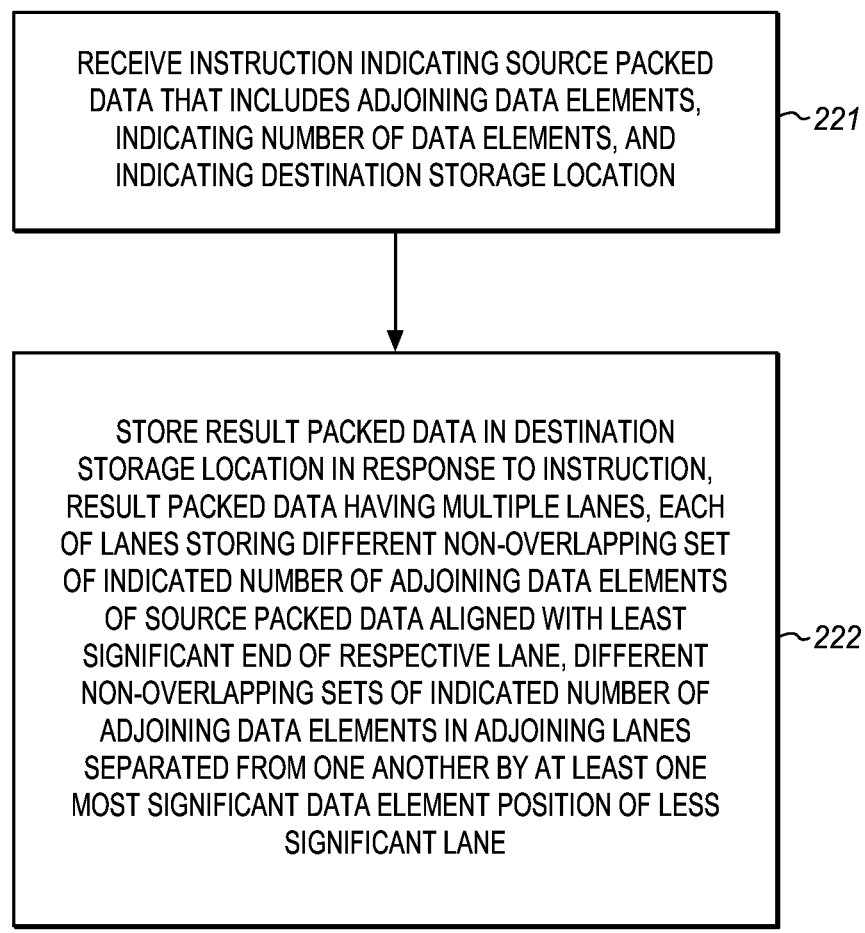
FIG. 2 is a block flow diagram of an embodiment of a method of performing an embodiment of a partition source packed data into lanes instruction.

FIG. 2 is a block flow diagram of an embodiment of a method 220 of performing an embodiment of a partition source packed data into lanes instruction. In various embodiments, the method may be performed by a processor, instruction processing apparatus, digital logic device, or integrated circuit. In some embodiments, the method 220 may be performed by and/or with the processor of FIG. 1 and/or using the instruction of FIG. 1. The components, features, and specific optional details described herein for the processor and/or the instruction of FIG. 1, also optionally apply to the method 220, which may optionally be performed by the processor and/or using the instruction. Alternatively, the method 220 may be performed by and/or within a similar or different processor or apparatus and/or using a similar or different instruction. Moreover, the processor of FIG. 1 may perform methods the same as, similar to, or different than the method of FIG. 2.

The method includes receiving the partition into lanes instruction, at block 221. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, an instruction fetch unit, etc.). The instruction may specify or otherwise indicate a source packed data that includes a plurality of adjoining data elements. The instruction may also specify or otherwise indicate a number of data elements. The instruction may also specify or otherwise indicate a destination packed data register or other storage location.

A result packed data may be stored in the indicated destination storage location in response to and/or as a result of the instruction, at block 222. In some embodiments, the result packed data and/or the destination storage location may have a plurality of lanes. In some embodiments, each of the lanes of the result packed data and/or destination storage location may store a different non-overlapping set of the indicated number of adjoining data elements of the source packed data. In other words, each lane may store a different non-overlapping same sized portion of the source packed data. Each of these different non-overlapping sets of data elements or different non-overlapping same sized portions of the source packed data may be aligned with a least significant end of the respective lanes in which they are stored. In some embodiments, the different non-overlapping sets of the indicated number of the adjoining data elements that are stored in adjoining lanes of the result packed data may be separated from one another by at least one most significant data element position of the less significant lane. For example, a second non-overlapping same sized portion of the source packed data that is stored in a next-to-least significant lane of the result packed data may be separated from a first non-overlapping same sized portion of the source packed data that is stored in a least significant lane of the result packed data by at least one most significant data element position of the least significant lane which is not used to store either of these two non-overlapping same sized portions of the source packed data. Rather, zeroes, existing values, or some other values may be stored in these positions.

The illustrated method involves architectural operations (e.g., those visible from a software perspective). In other embodiments, the method may optionally include one or more microarchitectural operations. By way of example, the instruction may be fetched, decoded, scheduled out-of-order, a source packed data may be accessed, an execution unit may perform microarchitectural operations to implement the instruction, etc. In some embodiments, the operations to implement the instruction may include generating memory address information and accessing the source packed data from system memory using the generated memory address information. In some embodiments, the operations to implement the instruction may also include zeroing at least one most significant data element position in each lane which separates the non-overlapping portions stored from the source packed data.

Figure 3:
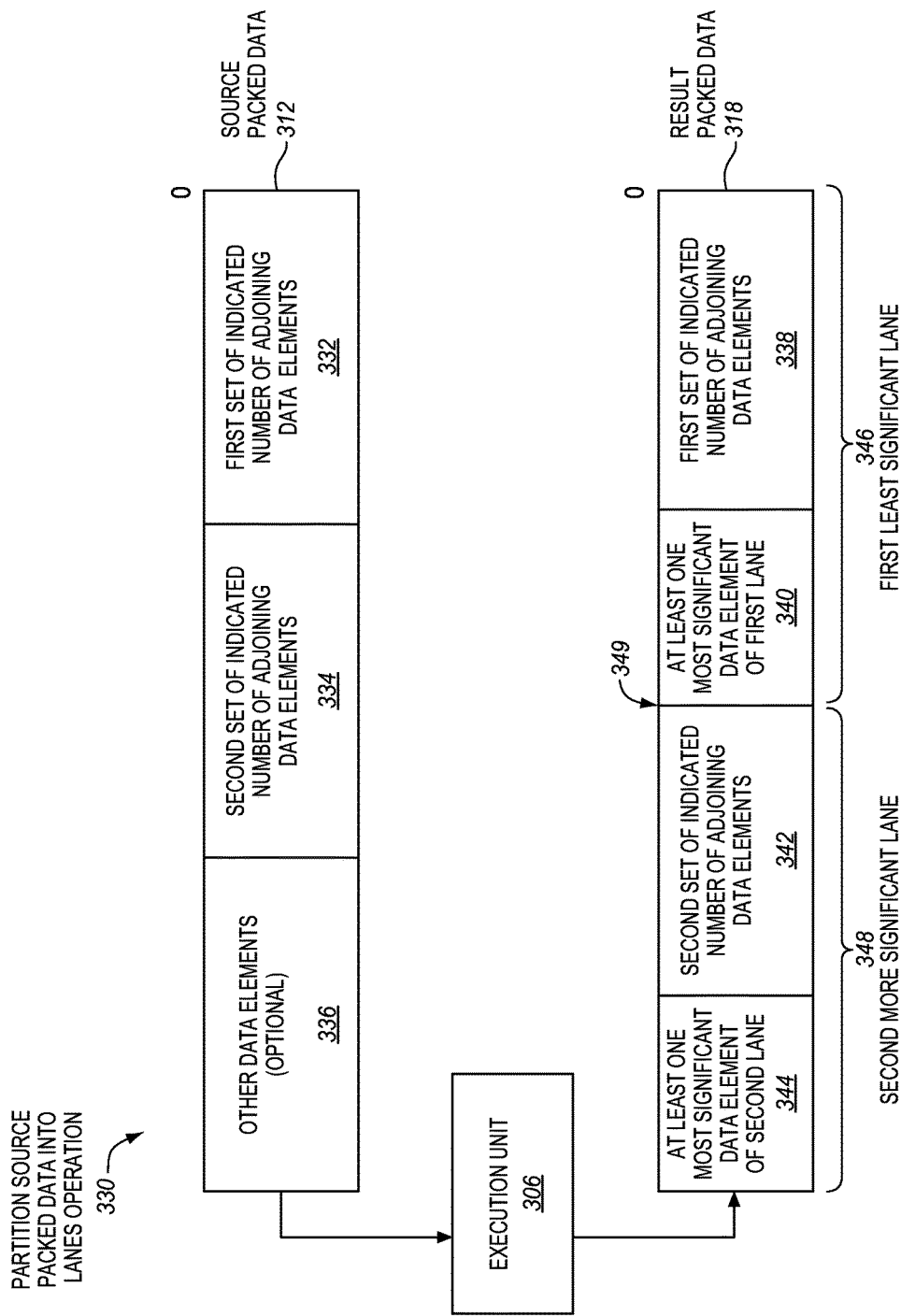
FIG. 3 is a block diagram of an embodiment of a partition source packed data into lanes operation.

FIG. 3 is a block diagram illustrating an embodiment of a partition source packed data into lanes operation 330 that may be performed in response to an embodiment of a partition source packed data into lanes instruction. The instruction may specify or otherwise indicate a source packed data 312 (e.g., as a source operand) that is to have a plurality of adjoining data elements. In some embodiments, the source packed data may be stored in memory, whereas in other embodiments the source packed data may be stored in a packed data register or other storage location. The instruction may also specify or otherwise indicate a number of data elements at which the source packed data is to be split. The instruction may also specify or otherwise indicate a destination storage location where a result packed data 318 is to be stored.

As shown, the source packed data may include at least two, or in some cases more than two (e.g., at least four), different non-overlapping sets of the indicated number of adjoining data elements. In the specific illustrated embodiment, the source packed data includes a first set of the indicated number of adjoining data elements 332, and a second set of the indicated number of adjoining data elements 334. Each set may include the number of data elements indicated by the instruction. For example, if the number of data elements indicated by the instruction is six, then each of the sets may include six data elements. The data elements of the source packed data are adjoining data elements, in that the data elements are contiguous and/or conterminous and/or in that there are no extra intervening data elements or bits between the adjoining data elements. In addition, in the source packed data, the first set of the indicated number of adjoining data elements 332 is adjoining, contiguous, or conterminous with the second set of the indicated number of adjoining data elements 334. For example, the most significant bit of the most significant data element of the first set of the indicated number of adjoining data elements 332 may be one bit less than the least significant bit of the least significant data element of the adjoining second set of the indicated number of adjoining data elements 334. In the illustration, the least significant bit (e.g., labeled as bit-0) of the source packed data is the rightmost bit, whereas the most significant bit of the source packed data is the leftmost bit. The source packed data may also optionally include one or more other data elements 336, although this is not required.

Commonly the number of data elements in the source packed data 312 may be equal to the size in bits of the source packed data divided by the size in bits of a single data element. In various embodiments, the width of the source packed data may be 128-bits, 256-bits, 512-bits, or 1024-bits, although the scope of the invention is not so limited. In various embodiments, the size of each data element may be 8-bits, 16-bits, 32-bits, or 64-bits, although the scope of the invention is not so limited. Other sizes or widths of the source packed data and the data elements are also suitable. In various embodiments, there may be at least at least four, at least eight, at least sixteen, at least thirty-two, or more than thirty-two data elements (e.g., at least sixty four), in the source packed data. The data elements may be integer, fixed point, or floating point. In some embodiments, the data elements may optionally be floating point data elements, such as, for example, 32-bit single precision floating point data elements, or 64-bit double precision floating point data elements, although the scope of the invention is not so limited.

During the partition source packed data into lanes operation, the source packed data 312 may be provided to an execution unit 306. The execution unit may generate and store a result packed data 318 in response to and/or as a consequence of the instruction and/or operation. In some embodiments, the result packed data may be stored in a destination packed data register, or other destination storage location, that is specified or otherwise indicated by the instruction. In some embodiments, the result packed data may have at least two, or in some cases more than two (e.g., at least four), different non-overlapping lanes. In the specific illustrated embodiment, the result packed data includes a first, least significant lane 346, and an adjoining second, more significant lane 348. In other embodiments, the result packed data may optionally include additional lanes (e.g., a same number of lanes as the number of different non-overlapping sets of the indicated number of adjoining data elements of the source packed data). In some embodiments, each of the lanes of the result packed data may be used to store a different non-overlapping set of the indicated number of adjoining data elements of the source packed data which is aligned with a least significant end of the respective lane. For example, as shown in the specific illustrated embodiment, in the result packed data, the first set of the indicated number of adjoining data elements 338 may be stored in the first, least significant lane 346, and the second set of the indicated number of adjoining data elements 342 may be stored in the second, more significant lane 348.

In some embodiments, in the result packed data, the different non-overlapping sets of the indicated number of the adjoining data elements that are stored in the adjoining lanes of the result packed data may be separated from one another by at least one most significant data element position of the less significant lane. For example, as shown in the specific illustrated embodiment, at least one most significant (e.g., leftmost as viewed) data element 340 of the first, least significant lane may separate the most significant data element of the first set of the indicated number of adjoining data elements 338 from the least significant data element of the second set of the indicated number of adjoining data elements 342. Similarly, at least one most significant (e.g., leftmost as viewed) data element 344 of the second, more significant lane would separate an optional additional set of the indicated number of adjoining data elements (if there were one, which is not shown in the illustrated example). In the source packed data, the first set of the indicated number of adjoining data elements 332 was adjoining, contiguous, or conterminous with the second set of the indicated number of adjoining data elements 334, whereas in the result packed data the first and second sets of the indicated number of adjoining data elements have been split so that they are no longer adjoining, contiguous, or conterminous with one another, and so that each is aligned with the least significant bit or end of the corresponding lane in which they are stored. The first set 338 is aligned with bit-0 of the result, and the second set 342 is aligned with the least significant bit (shown by reference numeral 349) of the second lane 348. Since these sets don't entirely fill the corresponding lanes, in at least some embodiments, one or more additional data elements in each lane separate these different sets of the indicated number of adjoining data elements.

In some embodiments, when the source packed data is in memory, the instruction may merely not load the other data elements 336. In other embodiments, the instruction may load these data elements but based on the indicated number of data elements may implicitly or inherently not use these other data elements 336. In still other embodiments, the instruction may indicate a mask or mask operand that may include a plurality of mask bits or other mask elements. The execution unit, in response to the instruction, may load from memory only data elements of the source packed data that correspond to unmasked mask elements of the mask. For example, each of the mask elements corresponding to the other data elements 336 may be masked out (e.g., cleared to zero), whereas each of the mask elements corresponding to the first and second sets 332, 334 may be unmasked (e.g., set to one).

Figure 4:
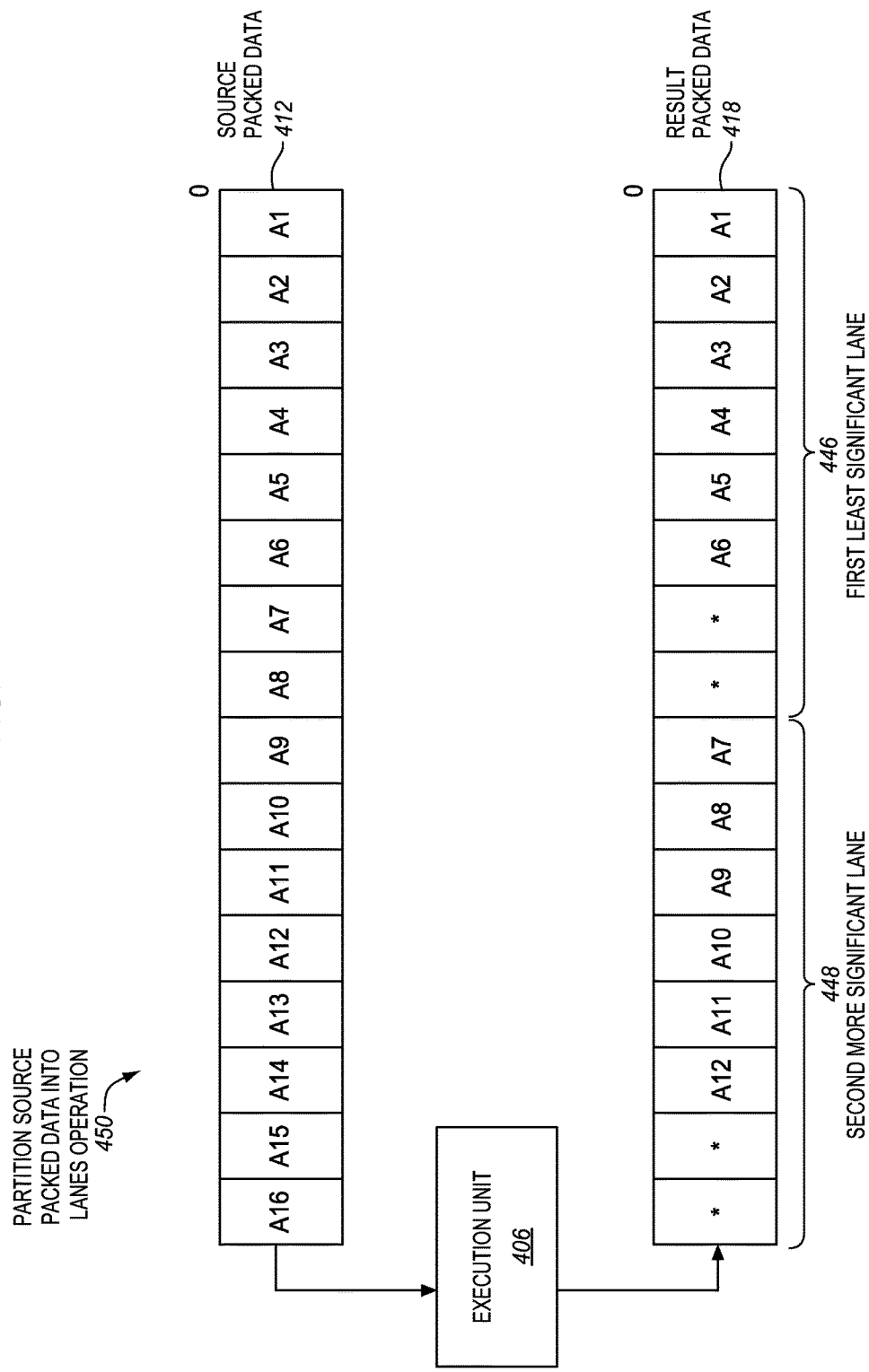
FIG. 4 is a block diagram of a first specific example embodiment of a partition source packed data into lanes operation.

FIG. 4 is a block diagram illustrating a first specific example embodiment of a partition source packed data into lanes operation 450 that may be performed in response to a first specific example embodiment of a partition source packed data into lanes instruction. The instruction may specify or otherwise indicate a source packed data 412 that is to have a plurality of adjoining data elements A1 through A16. The source packed data, and the data elements, may have various sizes or widths as previously described. Also, the data elements may have floating point, integer, or fixed point formats, as previously described. In some embodiments, the instruction may also specify or otherwise indicate a number of data elements at which the source packed data is to be split. In this specific example, the number of data elements indicated by the instruction is six data elements, although this is merely illustrative. The instruction may also specify or otherwise indicate a destination storage location.

In this specific example, since the number of data elements indicated by the instruction is six data elements, the data elements A1-A6 of the source packed data represent a first non-overlapping set of six adjoining data elements, and the data elements A7-A12 represent a second non-overlapping set of six adjoining data elements. In the source packed data, the data elements A1-A6 are adjoining, contiguous, or conterminous with the data elements A7-A12 (e.g., the most significant bit of the data element A6 is adjoining, contiguous, or conterminous with the least significant bit of the data element A7).

During the partition source packed data into lanes operation, the source packed data 412 may be provided to an execution unit 406. The execution unit may generate and store the result packed data 418 in response to and/or as a consequence of the instruction and/or operation. In some embodiments, the result packed data may be stored in a destination packed data register or other destination storage location indicated by the instruction. The result packed data includes a first, least significant lane 446, and an adjoining second, more significant lane 448. In other embodiments, the result packed data may optionally include additional lanes. In this specific example, the first set of the data elements A1-A6 are stored in the first lane 446, and the second set of the data elements A7-A12 are stored in the second adjoining lane.

In the result packed data, the first set of the data elements A1-A6 stored in the first lane are separated from the second set of the data elements A7-A12 stored in the second lane, in this specific example, by the two most significant (leftmost as viewed) data element positions of the first least significant lane. Whereas in the source packed data the data elements A1-A6 were adjoining, contiguous, or conterminous with the data elements A7-A12, in the result packed data the elements A1-A6 and A7-A12 are split or separated from one another with, in this specific example, two intervening data element positions disposed between them. Also, the data elements A1-A6 are aligned with the least significant bit or end of the first lane, whereas the data elements A7-A12 re aligned with the least significant bit or end of the second lane.

One use, but certainly not the only use, of the partition into lanes instructions and/or operations as disclosed herein is to process vectors or arrays of two data element, three data element, four data element, or other multiple data element structures. A complex number is one example of a two data element structure that includes a real number or component and an imaginary number or component. The real and imaginary numbers together constitute the complex number. One example of a three data element structure is a red, green, and blue color component structure for a pixel. Various other types of multiple data element structures are also known in the arts.

Such multiple data element structures are commonly moved and/or processed together in various different algorithms. Furthermore, arrays of such multiple data element structures are often moved and/or processed together in algorithms. For example, this is often the case when adding, multiplying, or otherwise processing matrices of complex numbers. By way of example, an algorithm may operate on an array having a relatively small number of complex numbers (e.g., often ranging from two to six) that is a portion of a potentially much larger matrix of complex numbers. As one specific illustrative example, certain algorithms may process arrays of three complex numbers each in which each complex number includes a 32-bit single precision floating point real component and a 32-bit single precision floating point imaginary component. Such arrays may represent portions of different adjoining rows of the larger matrix of complex numbers. Other algorithms may process arrays of complex numbers of different sizes.

Certain algorithms that process arrays of complex numbers and/or other multiple data element structures may expect each of the arrays to be aligned along lane boundaries. As one specific illustrative example, certain algorithms that process arrays of three complex numbers having 32-bit real and imaginary components, may expect each of the arrays to be aligned along 256-bit lane boundaries instead of spanning different lanes or being offset from a lane boundary. In other cases, even if the algorithm doesn't expect or require such alignment, it may be convenient and/or efficient for a given algorithm or application to have the arrays aligned along lane boundaries based on the ways in which the arrays can be processed, moved, managed by the overall algorithm, or the like.

Figure 5:
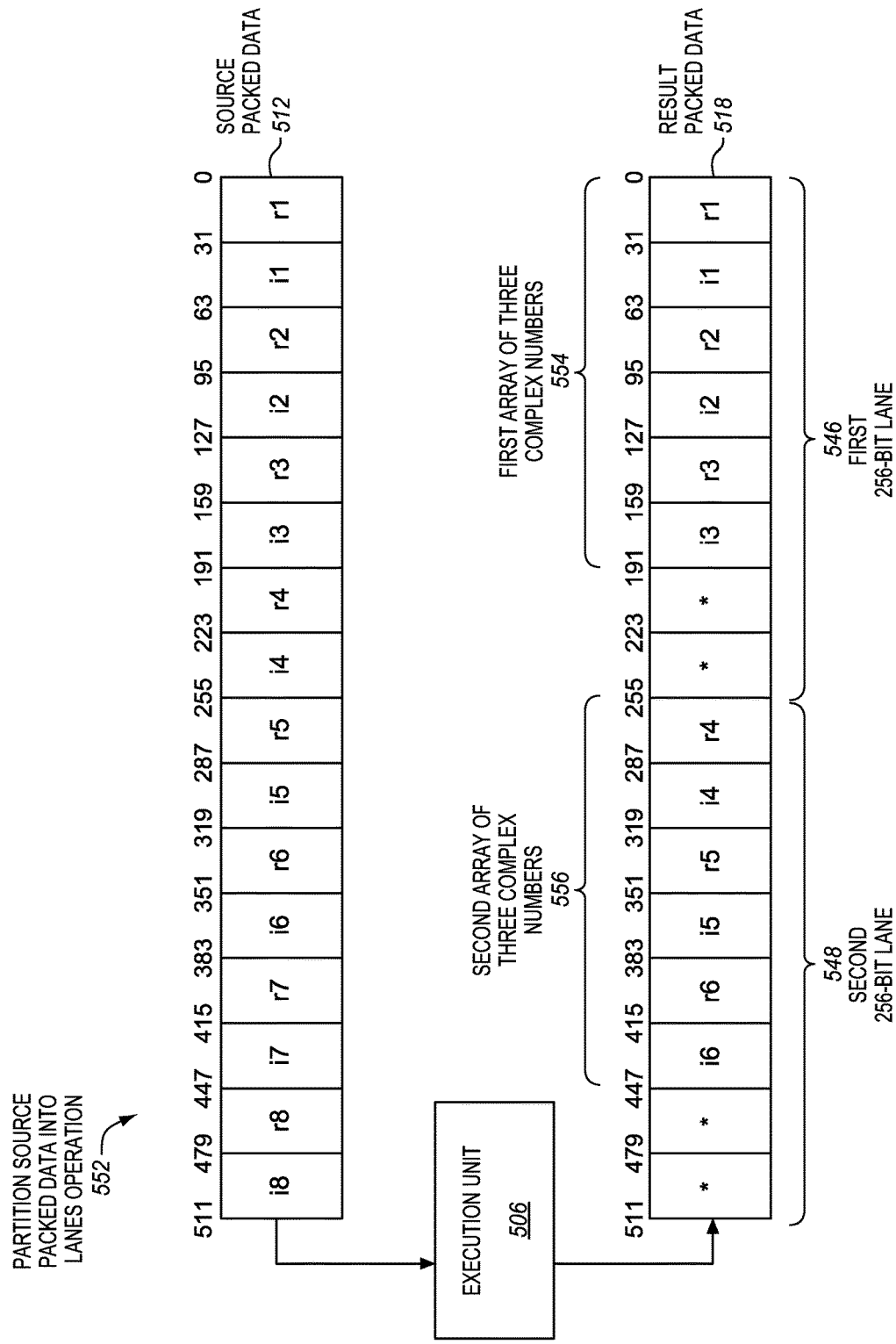
FIG. 5 is a block diagram of a second even more specific example embodiment of a partition source packed data into lanes operation.

FIG. 5 is a block diagram illustrating a second even more specific example embodiment of a partition source packed data into lanes operation 552 that may be performed on first and second arrays of three complex numbers in response to a second even more specific example embodiment of a partition source packed data into lanes instruction. The instruction may specify or otherwise indicate a source packed data 512. In some embodiments the source packed data may be in memory, whereas in other embodiments it may be in a packed data register. In this specific example, the source packed data has eight pairs of complex numbers. Each complex number includes a real number (r) and an imaginary number (i). For example, the least significant (rightmost as viewed) complex number includes a first real number (r1) and a first imaginary number (i1), the next to least significant complex number includes a second real number (r2) and a second imaginary number (i2), and so on. Conventionally, complex numbers are often stored in memory with the real numbers being stored in relatively less significant bit positions, and the corresponding imaginary numbers being stored in adjoining relatively more significant bit positions, although this is not required. The eight real numbers r1-r8, and eight imaginary numbers i1-i8, respectively form eight complex numbers. Each of the complex numbers may broadly represent a two data element structure. In some embodiments, the source packed data may include two arrays each having three complex numbers. By way of example, each of these arrays may represent a portion of a different adjoining row of a larger matrix of complex numbers, although the scope of the invention is not so limited. In this specific example, the real and imaginary numbers or components are each represented by a 32-bit single precision floating point data element, although in other embodiments other data element sizes and formats may optionally be used. In this specific example, the source packed data is a 512-bit source packed data, although in other embodiments other sizes may optionally be used.

As previously mentioned, in some embodiments, the instruction may also specify or otherwise indicate a number of data elements at which the source packed data is to be split (e.g., with a value of an immediate or a value in a specified or implicit register). In this specific example, the number of data elements indicated by the instruction is six data elements, although this is merely one illustrative example. For structures this number may be indicated in different ways. As one example, the instruction may indicate a value of six to indicate the six data elements. As another example, the instruction may indicate a value of three two data element structures to indicate the six data elements. In this specific example, since the number of data elements indicated by the instruction is six data elements, the least significant six real and imaginary numbers (i.e., r1, i1, r2, i2, r3, and i3) data represent a first array of three complex numbers, and the adjoining more significant six real and imaginary numbers (i.e., r4, i4, r5, i5, r6, and i6) represent a second array of three complex numbers. In the source packed data, the adjoining first and second arrays of complex numbers (or two data element structures) are adjoining, contiguous, or conterminous with one another.

During the operation, the source packed data 512 may be provided to an execution unit 506. The execution unit may generate and store the result packed data 518 in response to and/or as a consequence of the instruction and/or operation. In some embodiments, the result packed data may be stored in a destination packed data register or other destination storage location indicated by the instruction. The result packed data includes a first, least significant lane 546, and an adjoining second, more significant lane 548. In other embodiments, the result packed data may optionally include additional lanes. As shown, in this specific example, each of the lanes is a 256-bit lane, although the scope of the invention is not so limited. In this specific example, the first array of three complex numbers 554 (i.e., r1, i1, r2, i2, r3, and i3) is stored in the first lane, and the second array of three complex numbers 556 (i.e., r4, i4, r5, i5, r6, and i6) is stored in the second adjoining lane.

In the result packed data, the first array of three complex numbers 554 in the first lane is separated from the second array of three complex numbers 556 in the second lane, in this specific example, by two most significant (leftmost as viewed) 32-bit data element positions of the first lane. Whereas in the source packed data the first and second arrays of complex numbers were adjoining, contiguous, or conterminous, in the result packed data the first and second arrays of complex numbers are split or separated from one another with, in this specific example, two intervening 32-bit data element positions disposed between them. In some embodiments, the split may be along whole complex number or other multi data element structure boundaries so that you don't split a complex number or other multi data element structure. Also, each of the first and second arrays of three complex numbers is aligned with the least significant bit or end of the respective lane in which it is stored.

It is to be appreciated that this is just one illustrative example and that many other examples are also contemplated. As one example, the approach may be extended to 1024-bit operands where the result packed data has four 256-bit lanes. As another example, an analogous approach may be used with 16-bit data elements and 128-bit lanes of a 256-bit, 512-bit, or 1024-bit result packed data. Alternatively, in the case of 16-bit data elements, each 256-bit lane may be used to store twelve data elements (e.g., an array of six two data element structures). As another example, an analogous approach may be used with κ-bit data elements and 64-bit lanes of a 128-bit, 256-bit, or 512-bit result packed data. As a still further example, the arrays of three two data element structures may each be replaced by an array of two three data element structures. Still other variations will be apparent to those skilled in the art and having the benefit of the present disclosure. In addition, it is to be appreciated that the instructions/operations are not limited to operating on multiple data element structures, but in embodiments may represent general-purpose instructions/operations that may be used to operate on data elements that are not parts of multiple data element structures.

Figure 6:
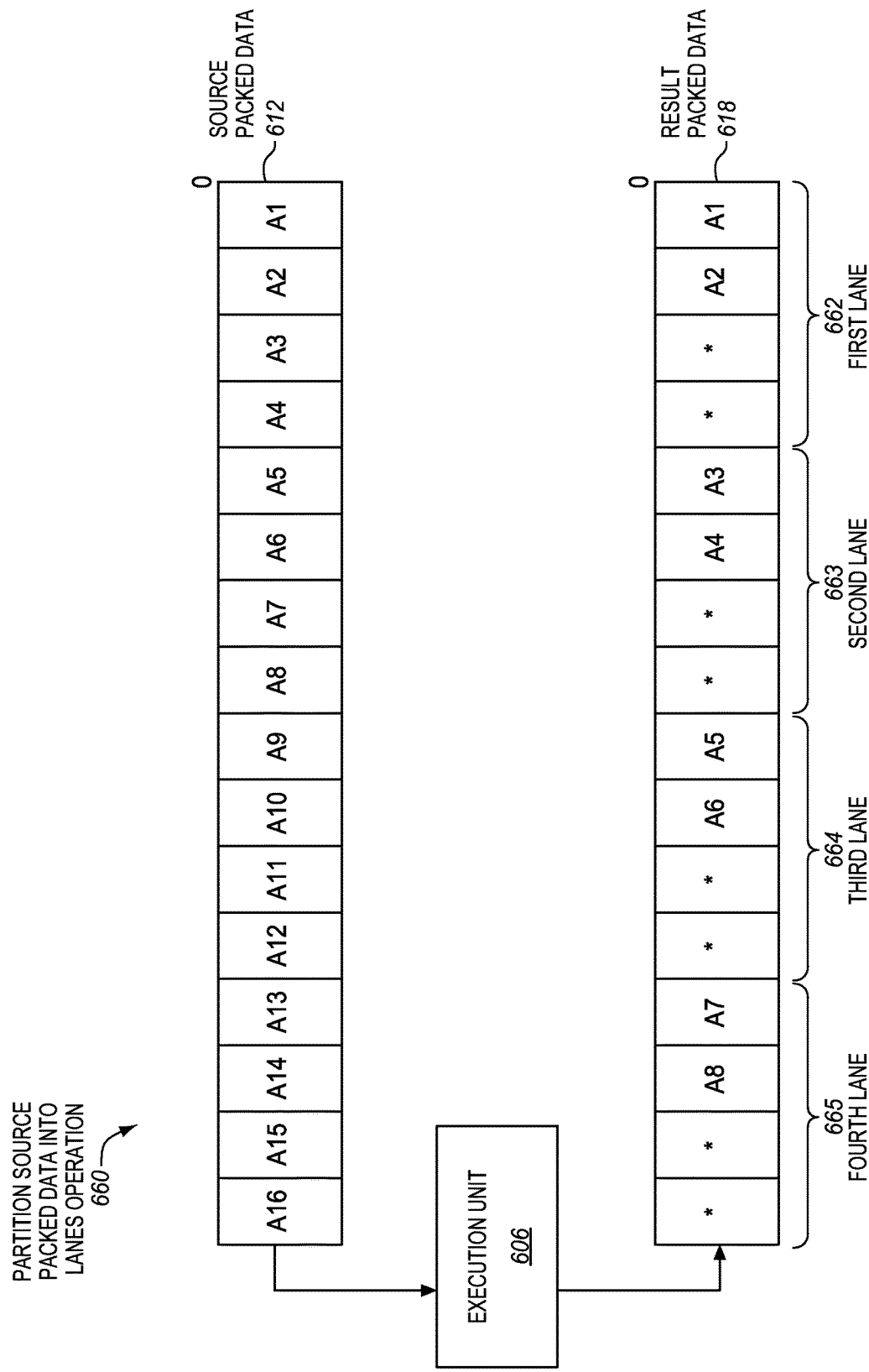
FIG. 6 is a block diagram of a third specific example embodiment of a partition source packed data into lanes operation.

FIG. 6 is a block diagram illustrating a third specific example embodiment of a partition source packed data into lanes operation 660 that may be performed in response to a third specific example embodiment of a partition source packed data into lanes instruction. The instruction may specify or otherwise indicate a source packed data 612 that is to have a plurality of adjoining data elements A1 through A16. The source packed data, and the data elements, may have various sizes or widths as previously described. Also, the data elements may have floating point, integer, or fixed point formats, as previously described. In some embodiments, the instruction may also specify or otherwise indicate a number of data elements at which the source packed data is to be split. In this specific example, the number of data elements indicated by the instruction is two data elements, although this is merely illustrative. The instruction may also specify or otherwise indicate a destination storage location.

In this specific example, since the number of data elements indicated by the instruction is two data elements, the data elements A1-A2 of the source packed data represent a first non-overlapping set of two adjoining data elements, the data elements A3-A4 represent a second non-overlapping set of two adjoining data elements, the data elements A5-A6 of the source packed data represent a third non-overlapping set of two adjoining data elements, and the data elements A7-A8 represent a fourth non-overlapping set of two adjoining data elements. In the source packed data, the data elements A1-A2 are adjoining, contiguous, or conterminous with the data elements A3-A4, the data elements A3-A4 are adjoining, contiguous, or conterminous with the data elements A5-A6, and the data elements A5-A6 are adjoining, contiguous, or conterminous with the data elements A7-A8.

During the operation, the source packed data 612 may be provided to an execution unit 606. The execution unit may generate and store the result packed data 618 in response to and/or as a consequence of the instruction and/or operation. In some embodiments, the result packed data may be stored in a destination packed data register or other destination storage location indicated by the instruction. The result packed data includes a first, least significant lane 662, a second, more significant lane 663, a third still more significant lane 664, and a fourth most significant lane 665. In other embodiments, the result packed data may optionally include fewer or more lanes. In this specific example, the first set of the data elements A1-A2 is stored in the first lane 662, the second set of the data elements A3-A4 is stored in the second lane 663, the third set of the data elements A5-A6 is stored in the third lane 664, and the fourth set of the data elements A7-A8 is stored in the fourth lane 665.

In the result packed data, the first set of the data elements A1-A2 are separated from the second set of the data elements A3-A4, in this specific example, by the two most significant (leftmost as viewed) data element positions of the first least significant lane. Likewise, in the result packed data, the third set of the data elements A5-A6 are separated from the second set of the data elements A3-A4, in this specific example, by the two most significant (leftmost as viewed) data element positions of the second lane. Similarly, in the result packed data, the fourth set of the data elements A7-A8 are separated from the third set of the data elements A5-A6, in this specific example, by the two most significant (leftmost as viewed) data element positions of the third lane. Also, the first set of the data elements A1-A2 are aligned with the least significant bit or end of the corresponding first lane, the second set of the data elements A3-A4 are aligned with the least significant bit or end of the corresponding second lane, the third set of the data elements A5-A6 are aligned with the least significant bit or end of the corresponding third lane, and the fourth set of the data elements A7-A8 are aligned with the least significant bit or end of the corresponding fourth lane.

Figure 7:
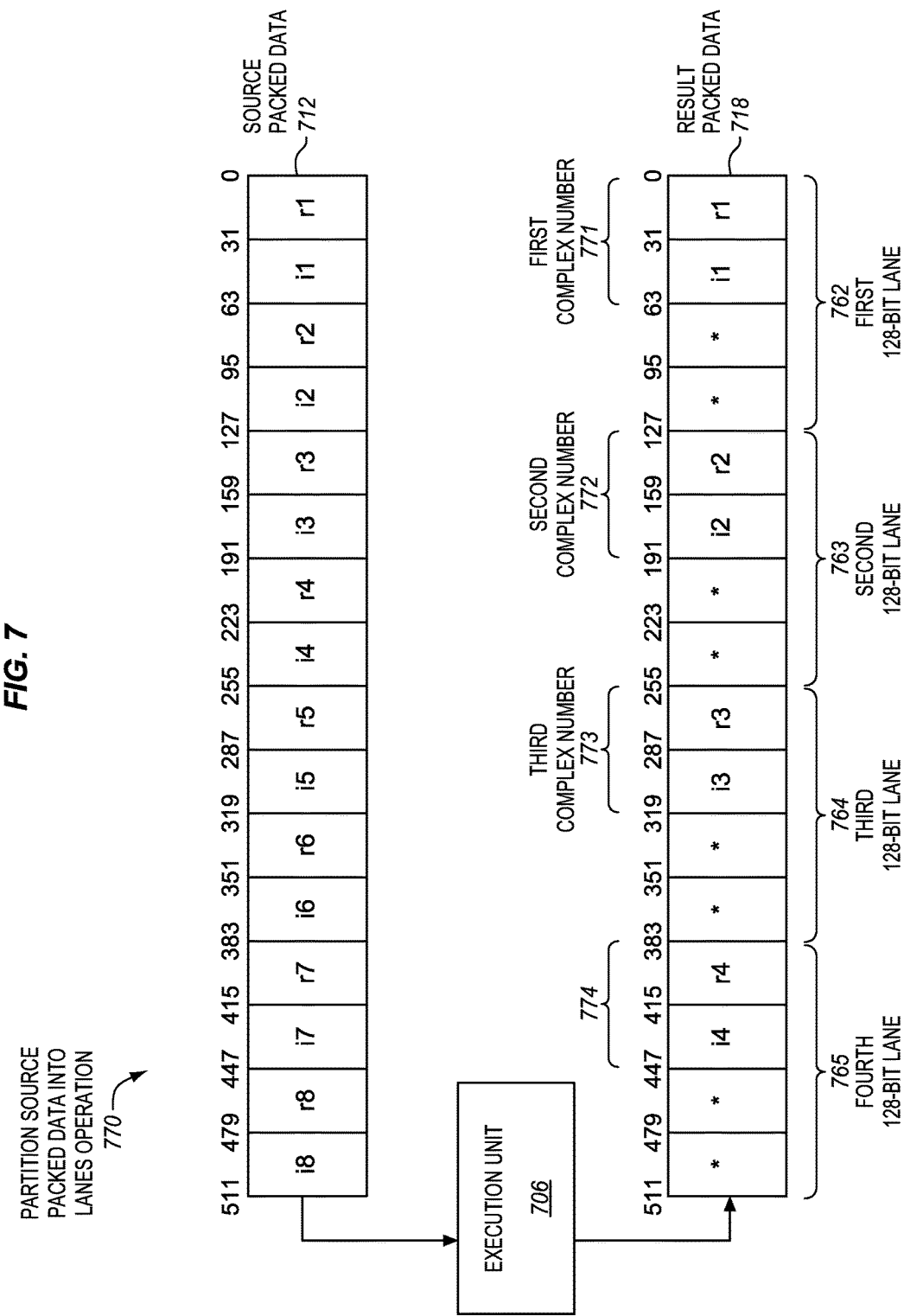
FIG. 7 is a block diagram of a fourth even more specific example embodiment of a partition source packed data into lanes operation.

FIG. 7 is a block diagram illustrating a fourth even more specific example embodiment of a partition source packed data into lanes operation 770 that may be performed on complex numbers in response to a fourth even more specific example embodiment of a partition source packed data into lanes instruction. The instruction may specify or otherwise indicate a source packed data 712. In this specific example, the source packed data has eight real numbers r1-r8, and eight imaginary numbers i1-i8, that pairwise form eight complex numbers. In this specific example, the real and imaginary numbers or components are each represented by a 32-bit single precision floating point data element, although in other embodiments other data element sizes and formats may optionally be used. In this specific example, the source packed data is a 512-bit source packed data, although in other embodiments other sizes may optionally be used.

In some embodiments, the instruction may specify or otherwise indicate a number of data elements at which the source packed data is to be split. In this specific example, the number of data elements indicated by the instruction is two data elements, although this is merely one illustrative example. As one example, the instruction may indicate a value of two to indicate the two data elements, or as another example the instruction may indicate a value of one to indicate one two data element structure to indicate the two data elements.

During the operation, the source packed data 712 may be provided to an execution unit 706. The execution unit may generate and store the result packed data 718 in response to and/or as a consequence of the instruction and/or operation. In some embodiments, the result packed data may be stored in a destination packed data register or other destination storage location indicated by the instruction. The result packed data includes a first, least significant lane 762, a second, more significant lane 763, a third still more significant lane 764, and a fourth most significant lane 765. In other embodiments, the result packed data may optionally include fewer or more lanes. In this specific example, each of the lanes is a 128-bit lane, although the scope of the invention is not so limited. In this specific example, first, least significant complex number 771 (i.e., r1 and i1) is stored in the first lane, the second least significant complex number 772 (i.e., r2 and i2) is stored in the second lane, the third least significant complex number 773 (i.e., r3 and i3) is stored in the third lane, and the fourth least significant complex number 774 (i.e., r4 and i4) is stored in the fourth lane.

In the result packed data, the first complex number 771 is separated from the second complex number 772, in this specific example, by two most significant 32-bit data element positions of the first lane. Likewise, in the result packed data, the third complex number 773 is separated from the second complex number 773, in this specific example, by two most significant 32-bit data element positions of the second lane. Similarly, in the result packed data, the fourth complex number 774 is separated from the third complex number 773, in this specific example, by two most significant 32-bit data element positions of the third lane. Also, in the result packed data, the first complex number is aligned with the least significant bit or end of the first lane, the second complex number is aligned with the least significant bit or end of the second lane, the third complex number is aligned with the least significant bit or end of the third lane, and the fourth complex number is aligned with the least significant bit or end of the fourth lane.

To avoid obscuring the description, the different and/or additional characteristics for the respective operations of FIGS. 3-7 have primarily been described, without repeating all the optionally similar or common characteristics and details. However, it is to be appreciated that the characteristics and details described for one of the operations may also optionally apply to the other operations, unless contrary to the description or otherwise clearly apparent.

Examples of suitable packed data formats include, but are not limited to, 64-bit wide, 128-bit wide, 256-bit wide, and 512-bit wide packed data formats. A 64-bit packed byte format may include eight 8-bit byte data elements. A 64-bit packed word format may include four 16-bit word data elements. A 64-bit packed doubleword format may include two 32-bit doubleword data elements. A 128-bit packed byte format may include sixteen 8-bit byte data elements. A 128-bit packed word format may include eight 16-bit word data elements. A 128-bit packed doubleword format may include four 32-bit doubleword data elements. A 128-bit packed quadword format 846 may include two 64-bit quadword data elements. A 256-bit packed byte format may include thirty-two 8-bit byte data elements. A 256-bit packed word format may include sixteen 16-bit word data elements. A 256-bit packed doubleword format may include eight 32-bit doubleword data elements. A 256-bit packed quadword format may include four 64-bit quadword data elements. A 512-bit packed byte format may include sixty-four 8-bit byte data elements. A 512-bit packed word format may include thirty-two 16-bit word data elements. A 512-bit packed doubleword format may include sixteen 32-bit doubleword data elements. A 512-bit packed quadword format may include eight 64-bit quadword data elements. Other packed data formats may include packed 32-bit single-precision floating point data elements or packed 64-bit double-precision floating data elements. Moreover, wider packed data widths (e.g., 1024-bit wide packed data) and/or narrower packed data widths (e.g., 32-bit wide packed data) are also suitable. Generally, the number of packed data elements in a packed data operand is equal to the size in bits of the packed data operand divided by the size in bits of each of the packed data elements.

Figure 8:
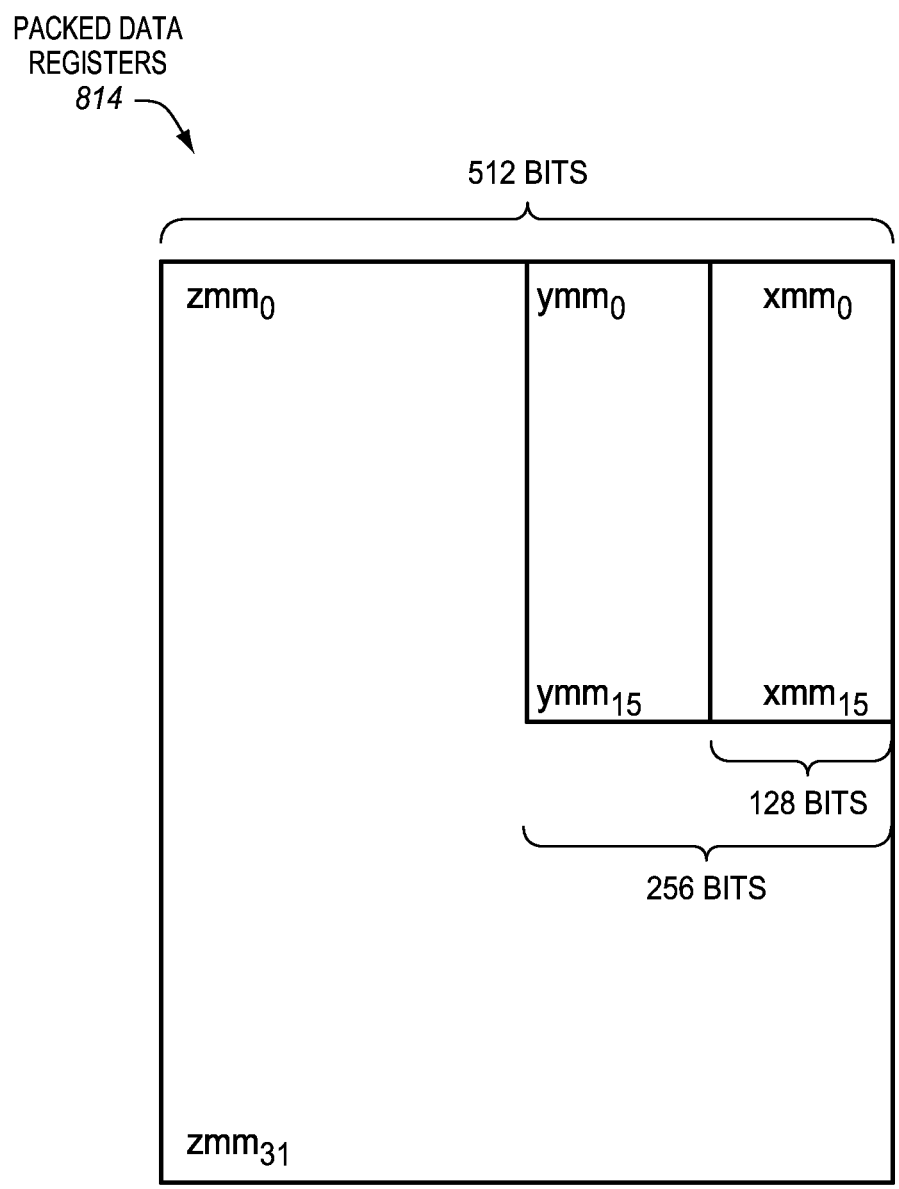
FIG. 8 is a block diagram of an example embodiment of a suitable set of packed data registers.

FIG. 8 is a block diagram of an example embodiment of a suitable set of packed data registers 814. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operative to hold 512-bit packed data, 256-bit packed data, or 128-bit packed data. The 256-bit registers YMM0-YMM15 are operative to hold 256-bit packed data or 128-bit packed data. The 128-bit registers XMM0-XMM15 are operative to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 9:
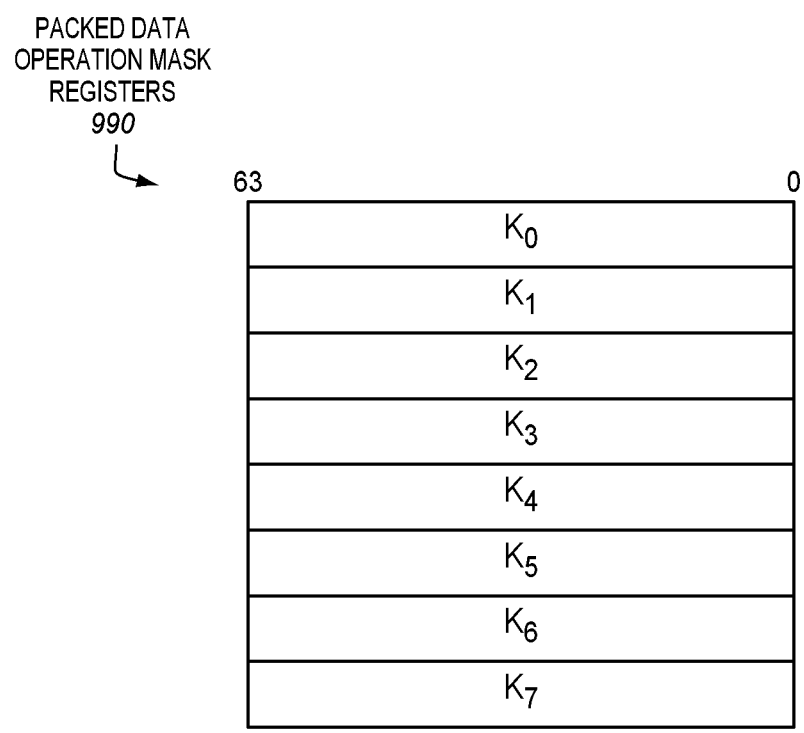
FIG. 9 is a block diagram of an example embodiment of a suitable set of packed data operation mask registers.

FIG. 9 is a block diagram of an example embodiment of a suitable set of packed data operation mask registers 990. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). Each of these registers may be used to store a packed data operation mask. In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc.). The registers may be implemented in different ways and are not limited to any particular type of circuit or design. Examples of suitable registers include, but are not limited to, dedicated physical registers, dynamically allocated physical registers using register renaming, and combinations thereof.

In some embodiments, the packed data operation mask registers 990 may be a separate, dedicated set of architectural registers. In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has a "no mask" encoding), although this is not required.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 10A illustrates an exemplary AVX instruction format including a VEX prefix 1002, real opcode field 1030, Mod R/M byte 1040, SIB byte 1050, displacement field 1062, and IMM8 1072. FIG. 10B illustrates which fields from FIG. 10A make up a full opcode field 1074 and a base operation field 1042a. FIG. 10C illustrates which fields from FIG. 10A make up a register index field 1144.

VEX Prefix (Bytes 0-2) 1002 is encoded in a three-byte form. The first byte is the Format Field 1040a (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1005 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1015 (VEX byte 1, bits [4:0]-mmmmm) includes content to encode an implied leading opcode byte. W Field 1064 (VEX byte 2, bit [7]-W)—is represented by the notation VEX.W, and provides different functions depending on the instruction. The role of VEX.vvvv 1020 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1011b. If VEX.L 1068 Size field (VEX byte 2, bit [2]-L)=0, it indicates 128 bit vector; if VEX.L=1, it indicates 256 bit vector. Prefix encoding field 1025 (VEX byte 2, bits [1:0]-pp) provides additional bits for the base operation field.

Real Opcode Field 1030 (Byte 3) is also known as the opcode byte. Part of the opcode is specified in this field.

MOD R/M Field 1040 (Byte 4) includes MOD field 1042 (bits [7-6]), Reg field 1044 (bits [5-3]), and R/M field 1046 (bits [2-0]). The role of Reg field 1044 may include the following: encoding either the destination register operand or a source register operand (the rrr of Rrrr), or be treated as an opcode extension and not used to encode any instruction operand. The role of R/M field 1046 may include the following: encoding the instruction operand that references a memory address, or encoding either the destination register operand or a source register operand.

Scale, Index, Base (SIB)—The content of Scale field 1050 (Byte 5) includes SS 1052 (bits [7-6]), which is used for memory address generation. The contents of SIB.xxx 1054 (bits [5-3]) and SIB.bbb 1056 (bits [2-0]) have been previously referred to with regard to the register indexes Xxxx and Bbbb.

The Displacement Field 1062 and the immediate field (IMM8) 1072 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11B:
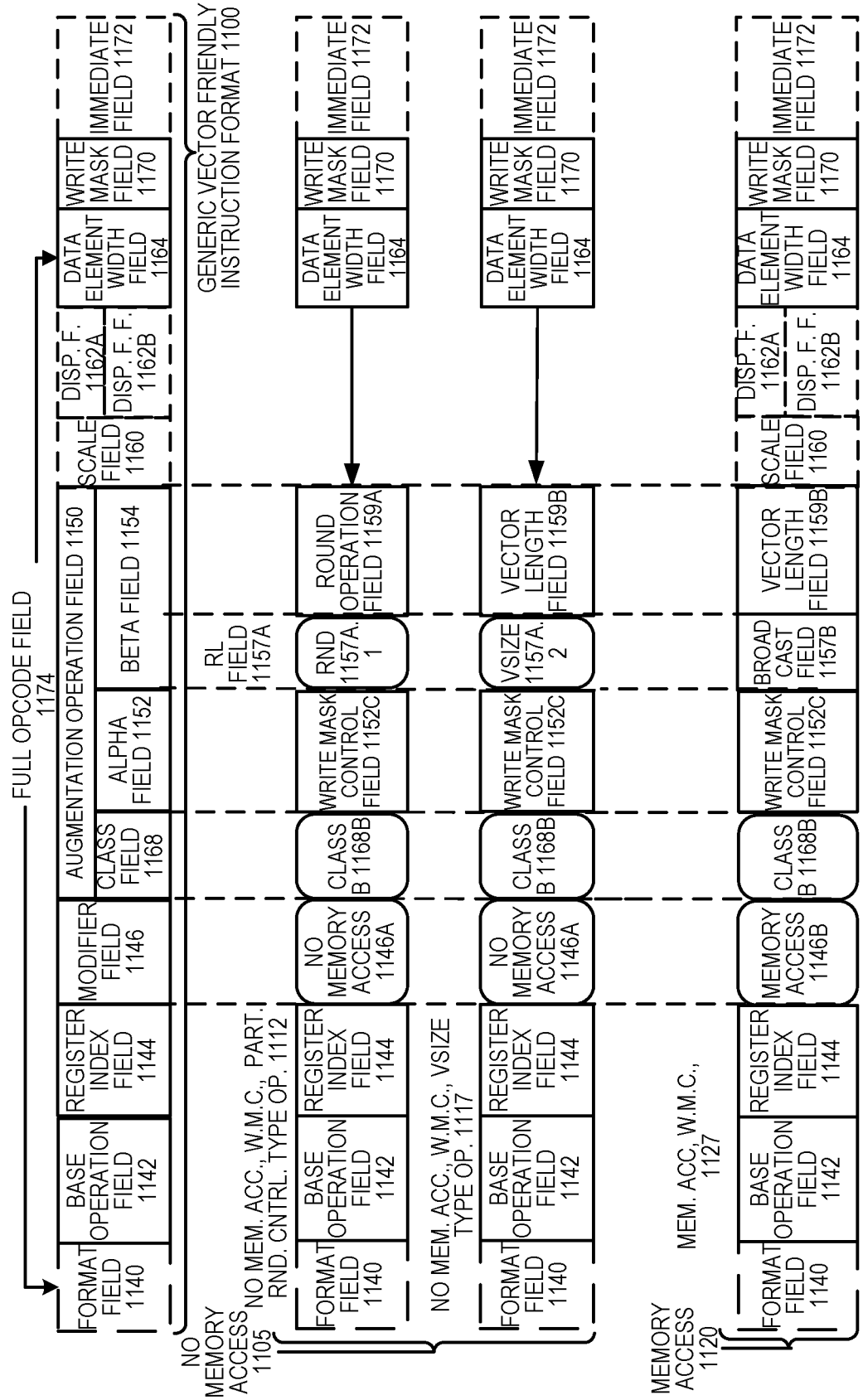

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access 1146B from those that; do not 1146A; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement factor field 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1158 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement factor field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement factor field 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1159A content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement factor field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the invention. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 1157BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1011B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1011b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6) 1250—As previously described, the scale field's 1160 content is used for memory address generation. SIB.xxx 1254 and SIB.bbb 1256—the contents of these fields have been previously referred to with regard to the register indexes Xxxx and Bbbb. Also shown in SS 1252

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 117 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1172 operates as previously described.

Full Opcode Field

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
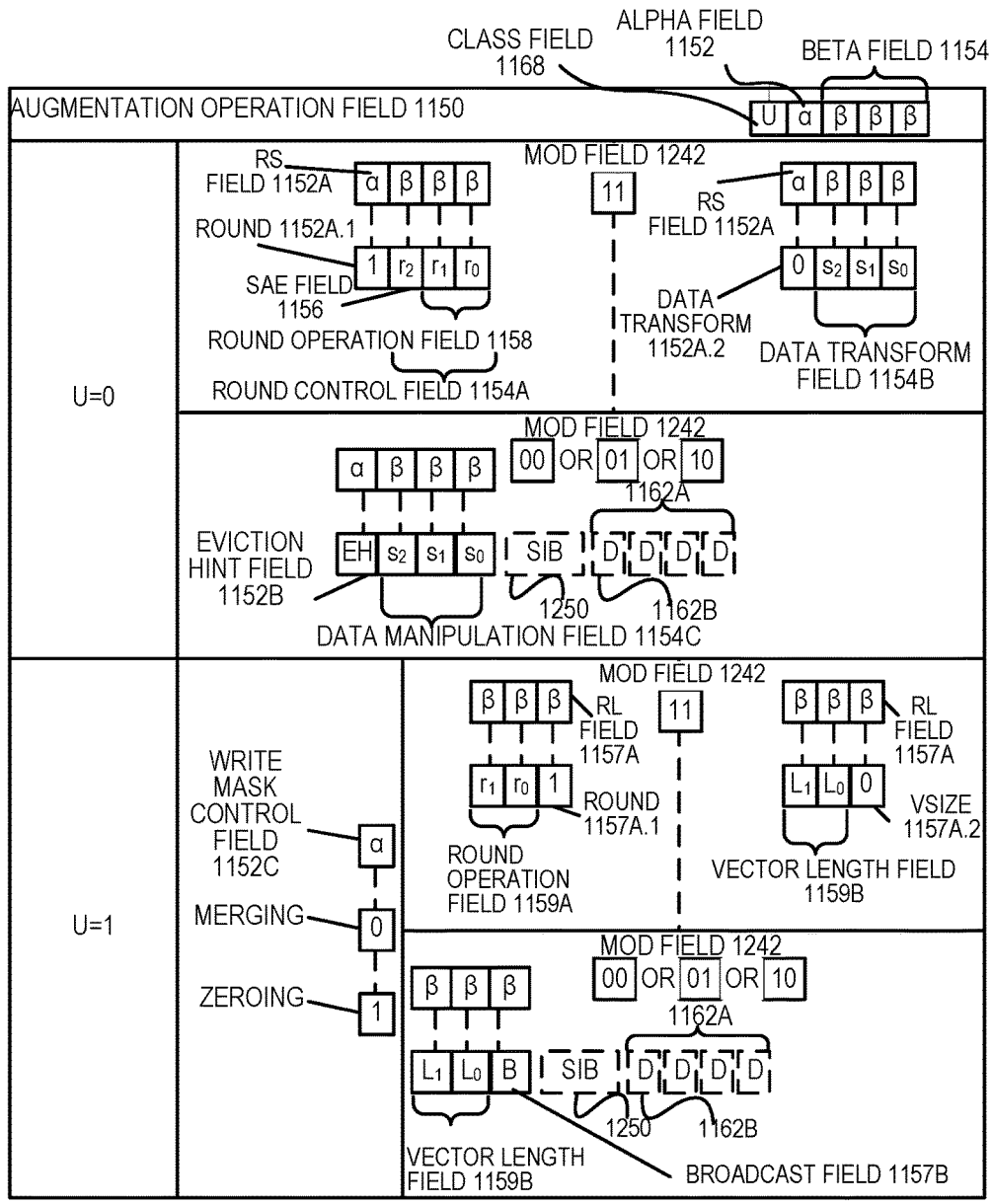

FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
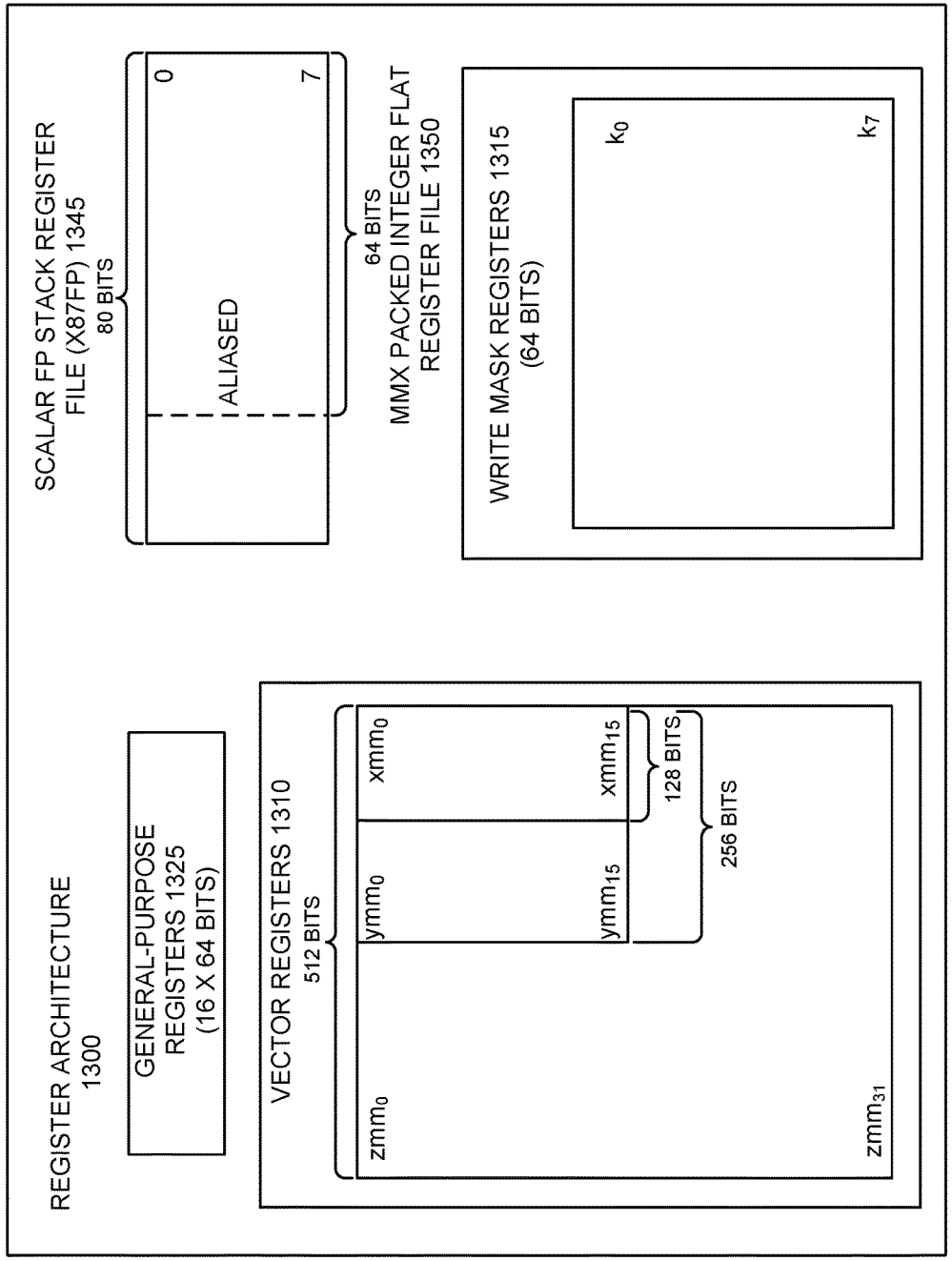
FIG. 13 is a block diagram of an embodiment of a register architecture.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file unit(s) 1458. Each of the physical register file unit(s) 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1458 comprises a vector registers unit, a write mask registers unit, and a scalar registers unit. These register units may provide architectural vector registers, vector mask registers, and general purpose registers. The physical register file unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1454 and the physical register file unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file unit(s) 1458 and the memory unit 1470 perform the register read/memory read stage 1414; the execution cluster 1460 perform the execute stage 1416; 6) the memory unit 1470 and the physical register file unit(s) 1458 perform the write back/memory write stage 1418; 7) various units may be involved in the exception handling stage 1422; and 8) the retirement unit 1454 and the physical register file unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
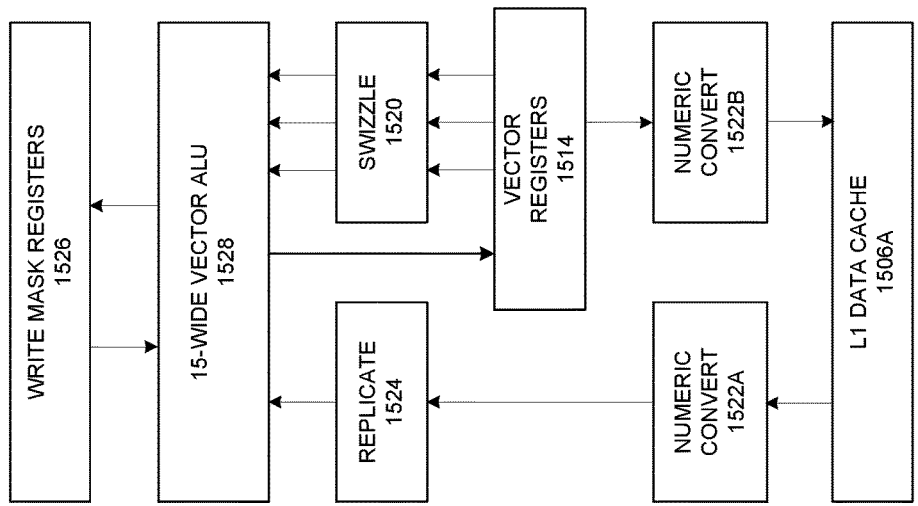
FIG. 15B is a block diagram of an embodiment of an expanded view of part of the processor core of FIG. 15A.
Figure 15A:
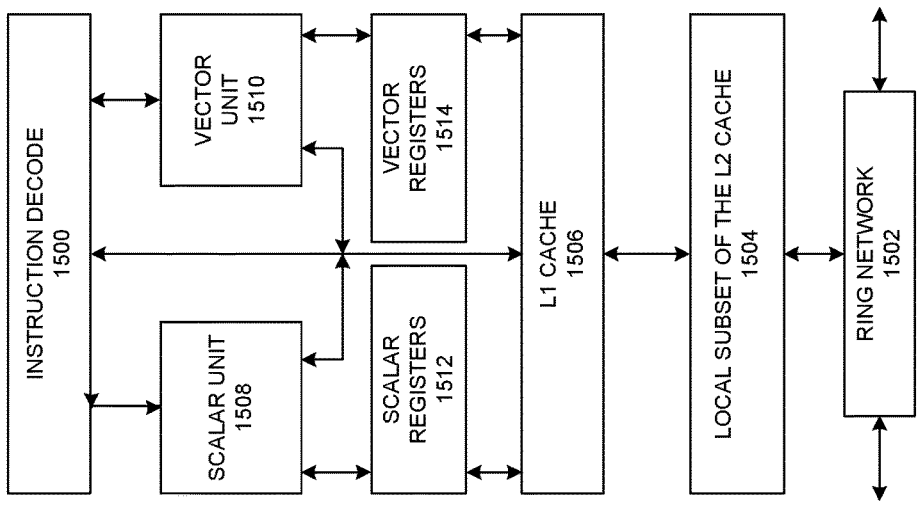
FIG. 15A is a block diagram of an embodiment of a single processor core, along with its connection to the on-die interconnect network, and with its local subset of the Level 2 (L2) cache.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 11512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache part 1506A of the L1 cache 1506, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Processor with Integrated Memory Controller and Graphics

Figure 16:
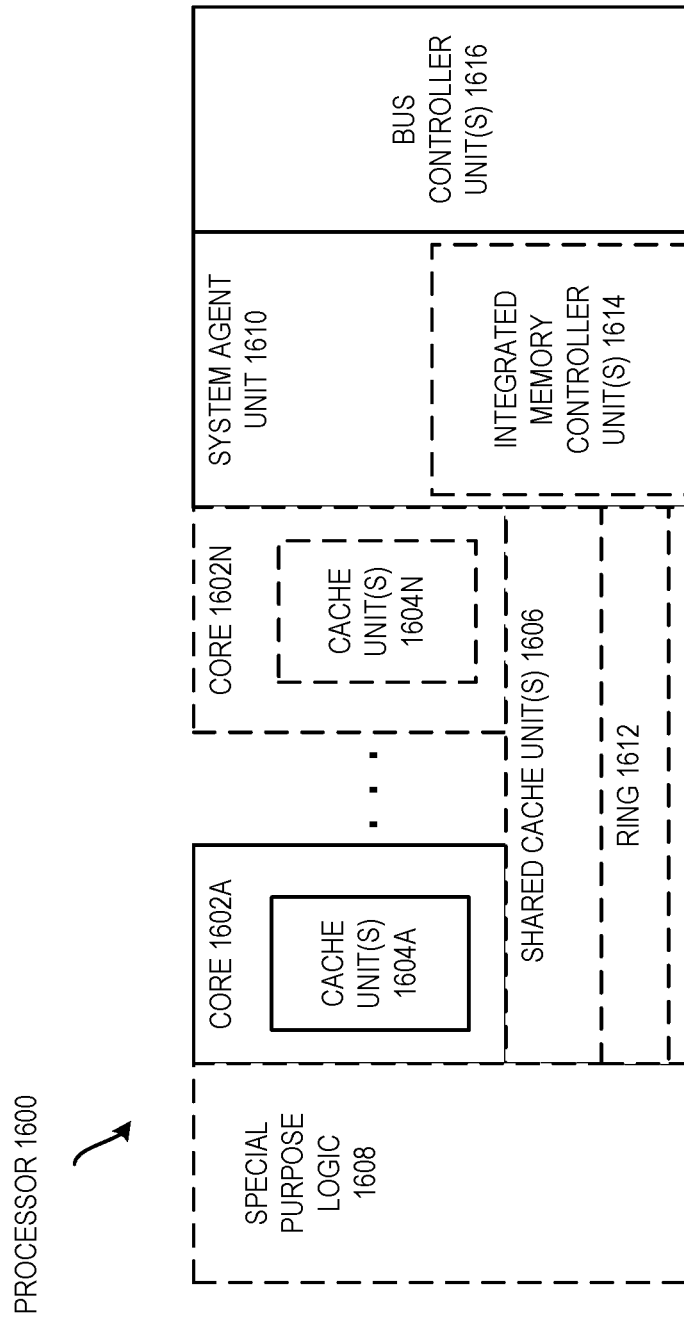
FIG. 16 is a block diagram of an embodiment of a processor that may have more than one core, may have an integrated memory controller, and may have integrated graphics.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache 1604A-N within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of executing the same instruction set, while others may be capable of executing only a subset of that instruction set or a different instruction set.

Exemplary Computer Architectures

FIGS. 17-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
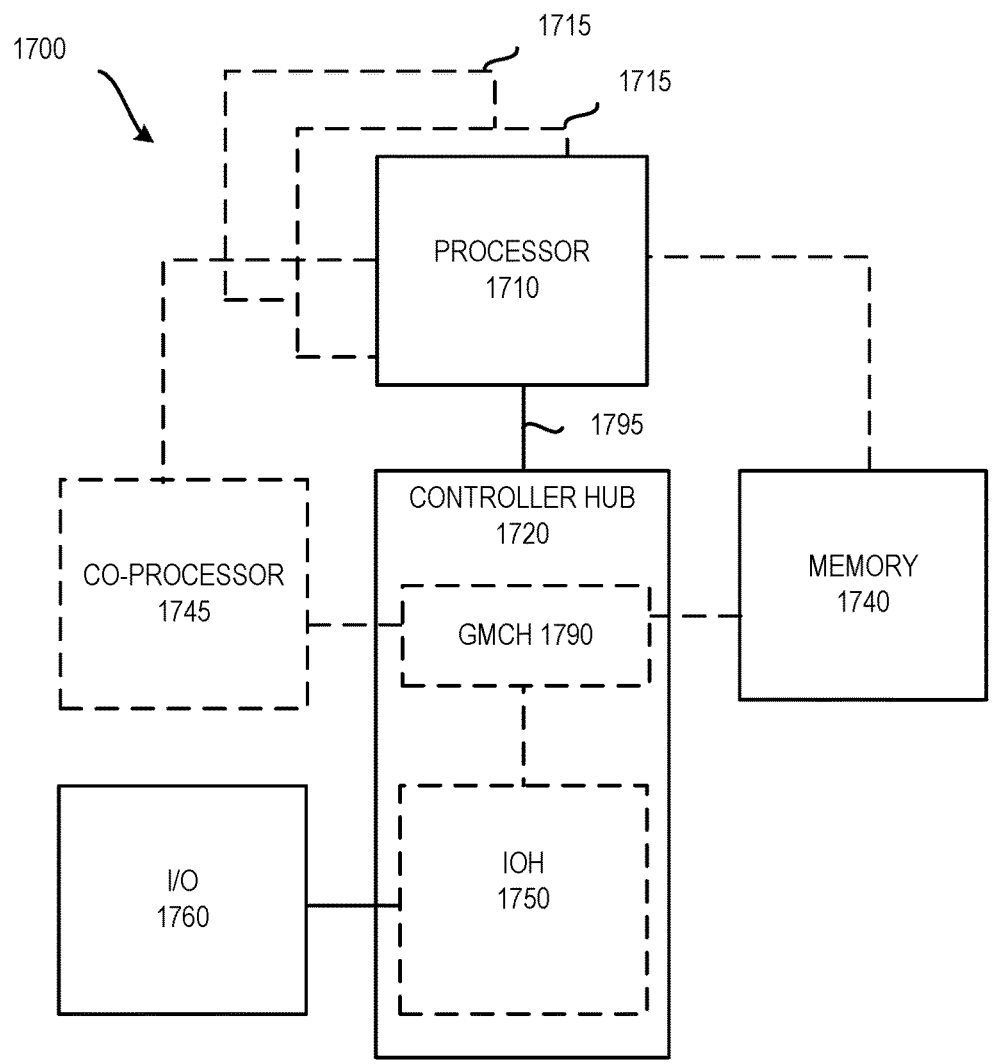
FIG. 17 is a block diagram of a first embodiment of a computer architecture.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
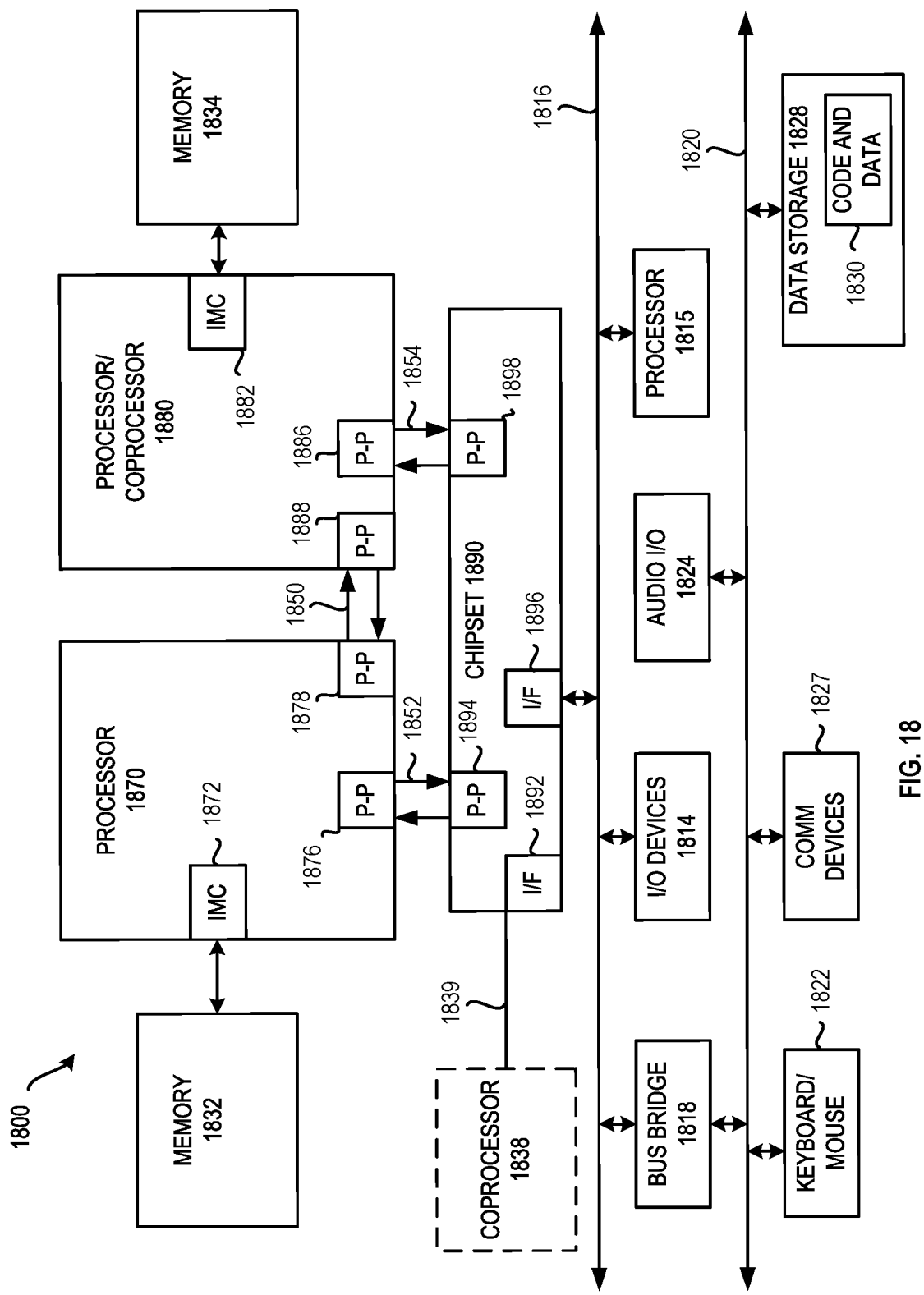
FIG. 18 is a block diagram of a second embodiment of a computer architecture.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 and coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839, 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
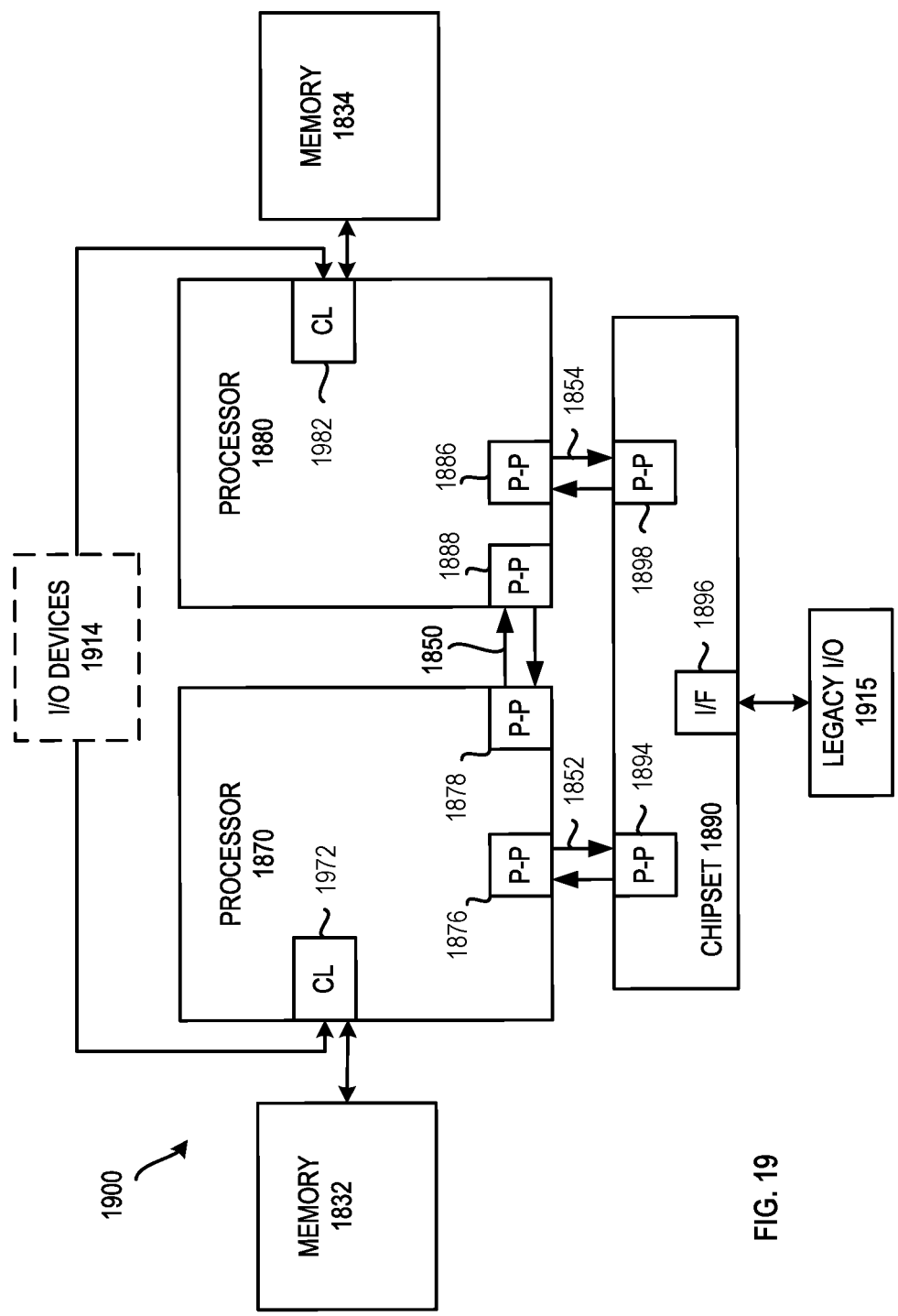
FIG. 19 is a block diagram of a third embodiment of a computer architecture.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1972 and 1982, respectively. Thus, the CL 1972, 1982 include integrated memory controller units and include I/O control logic. FIG. 19 illustrates that not only are the memories 1832, 1834 coupled to the CL 1972, 1982, but also that I/O devices 1914 are also coupled to the control logic 1972, 1982. Legacy I/O devices 1915 are coupled to the chipset 1890.

Figure 20:
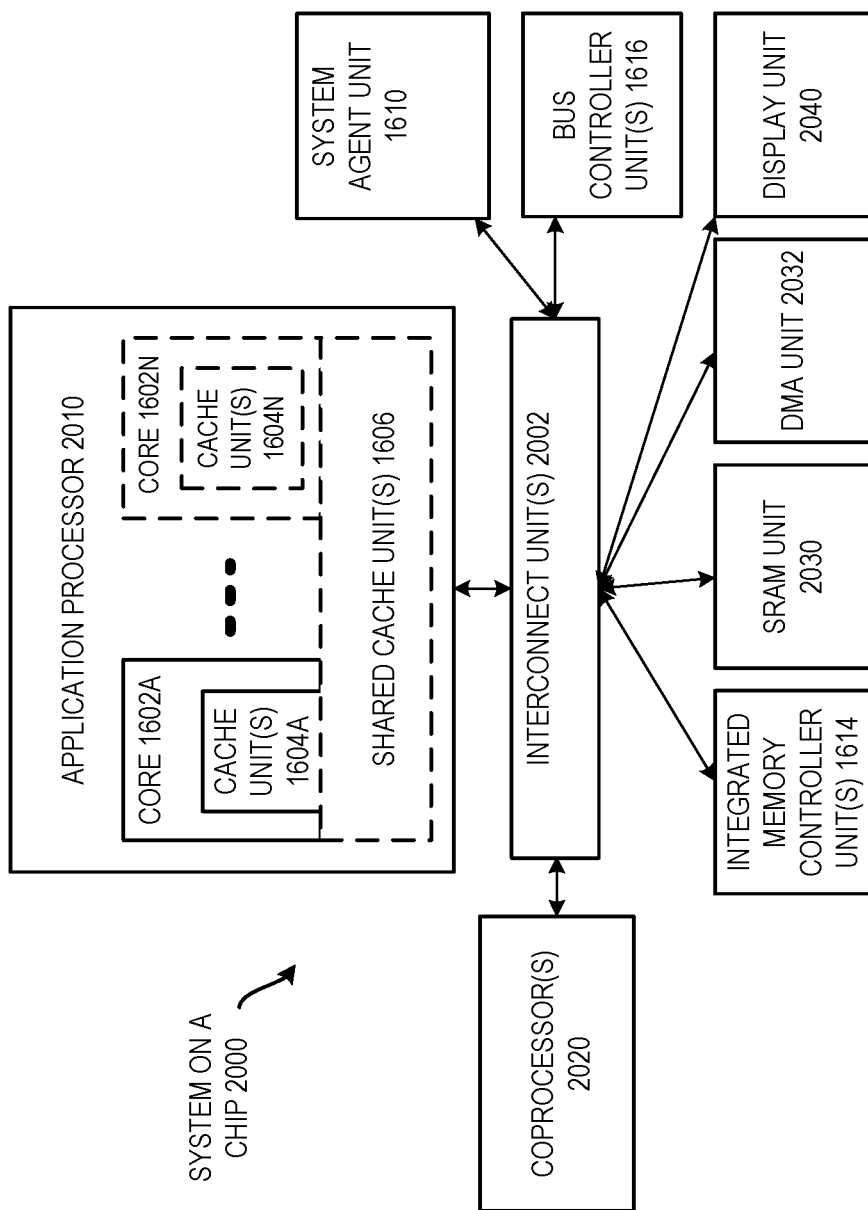
FIG. 20 is a block diagram of a fourth embodiment of a computer architecture.

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 192A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; a static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
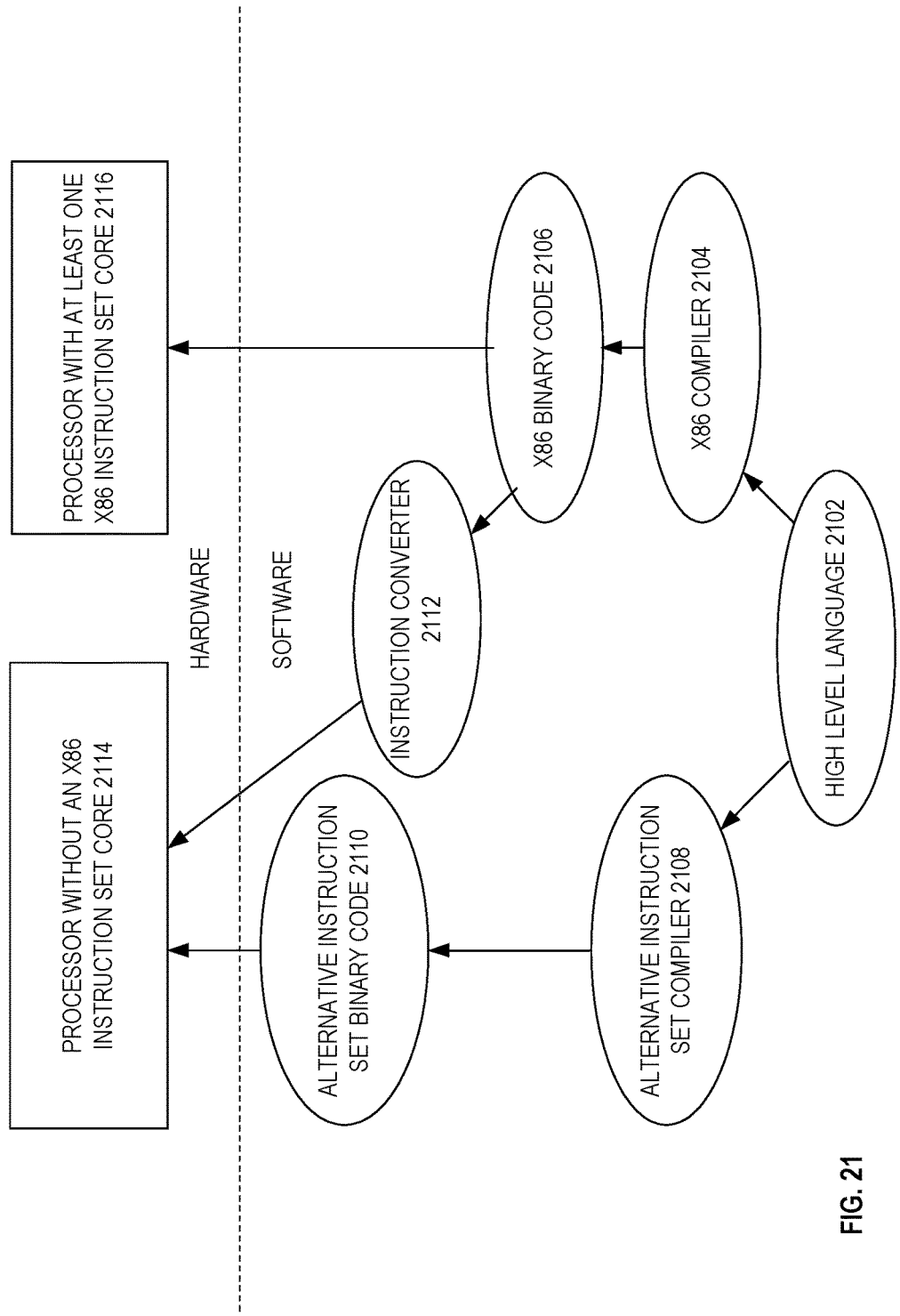
FIG. 21 is a block diagram of use of a software instruction converter to convert binary instructions in a source instruction set to binary instructions in a target instruction set, according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Components, features, and details described for any of FIGS. 3-9 may also optionally apply to any of FIGS. 1-2. Components, features, and details described for any of the processors disclosed herein (e.g., processor 100) may optionally apply to any of the methods disclosed herein (e.g., method 220), which in embodiments may optionally be performed by and/or with such processors. Any of the processors described herein (e.g., processor 100) in embodiments may optionally be included in any of the systems disclosed herein (e.g., any of the systems of FIGS. 17-20). Any of the processors described herein (e.g., processor 100) in embodiments may optionally have any of the microarchitectures shown herein (e.g., FIGS. 14B, 15A/B). In addition, any of the instructions disclosed herein may in some embodiments optionally have any of the features or details of the instruction formats shown herein (e.g., the formats described for FIGS. 10A/B/C, 11A/B, 12A/B/C/D).

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit.

Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor including a plurality of packed data registers, and a decode unit to decode an instruction. The instruction to indicate a source packed data that is to include a plurality of adjoining data elements, the instruction to indicate a number of data elements, and the instruction to indicate a destination storage location. The processor also includes an execution unit coupled with the plurality of packed data registers, and coupled with the decode unit. The execution unit, in response to the instruction, to store a result packed data in the destination storage location. The result packed data to have a plurality of lanes. Each of the lanes of the result packed data to store a different non-overlapping set of the indicated number of adjoining data elements of the source packed data aligned with a least significant end of the respective lane. The different non-overlapping sets of the indicated number of the adjoining data elements in adjoining lanes of the result packed data to be separated from one another by at least one most significant data element position of the less significant lane.

Example 2 includes the processor of Example 1, in which the decode unit is to decode the instruction that is to have an immediate to indicate the number of the data elements.

Example 3 includes the processor of any one of Examples 1 to 2, in which the decode unit is to decode the instruction that is to indicate the number of data elements through an indication of a number of structures that each are to include a same number of data elements.

Example 4 includes the processor of any one of Examples 1 to 3, in which the decode unit is to decode the instruction that is to indicate the source packed data in system memory. Also, optionally in which the execution unit, in response to the instruction, is to load at least each of the different non-overlapping sets of the data elements from the system memory with a single load operation.

Example 5 includes the processor of Example 4, in which the decode unit is to decode the instruction that is to indicate a mask that is to include a plurality of mask elements. Also, optionally in which the execution unit, in response to the instruction, is to load from the system memory only data elements of the source packed data that correspond to unmasked mask elements of the mask.

Example 6 includes the processor of any one of Examples 1 to 5, in which the decode unit is to decode the instruction that is to indicate the source packed data which is to include 32-bit single precision floating point data elements, and that is to indicate a 512-bit destination packed data register. Also, optionally in which the execution unit, in response to the instruction, is to store the result packed data, which is to be a 512-bit result packed data, and which is to have two 256-bit lanes. Also, optionally in which each of the 256-bit lanes is to store the corresponding different non-overlapping set of the adjoining 32-bit single precision floating point data elements aligned with the least significant end of the respective 256-bit lane. Also, optionally in which the different non-overlapping sets of the adjoining 32-bit single precision floating point data elements in the adjoining 256-bit lanes of the 512-bit result packed data are to be separated from one another by the at least one most significant 32-bit data element position of the less significant 256-bit lane.

Example 7 includes the processor of any one of Examples 1 to 5, in which the decode unit is to decode the instruction that is to indicate the source packed data which is to include 32-bit single precision floating point data elements, and that is to indicate an at least 256-bit destination packed data register. Also, optionally in which the execution unit, in response to the instruction, is to store the result packed data, which is to be an at least 256-bit result packed data, and which is to have at least two 128-bit lanes. Also, optionally in which each of the at least two 128-bit lanes is to store the corresponding different non-overlapping set of the adjoining 32-bit single precision floating point data elements aligned with the least significant end of the respective 128-bit lane. Also, optionally in which the different non-overlapping sets of the adjoining 32-bit single precision floating point data elements in the adjoining 128-bit lanes of the at least 256-bit result packed data are to be separated from one another by the at least one most significant 32-bit data element position of the less significant 128-bit lane.

Example 8 includes the processor of any one of Examples 1 to 5, in which the decode unit is to decode the instruction that is to indicate the source packed data that is to include 32-bit data elements.

Example 9 includes the processor of any one of Examples 1 to 5, in which the decode unit is to decode the instruction that is to indicate the source packed data that is to include 64-bit data elements.

Example 10 includes the processor of any one of Examples 1 to 5, in which the execution unit, in response to the instruction, is to store the result packed data in which each of the lanes is a 128-bit lane.

Example 11 includes the processor of any one of Examples 1 to 5, in which the execution unit, in response to the instruction, is to store the result packed data in which each of the lanes is a 256-bit lane.

Example 12 includes the processor of any one of Examples 1 to 11, in which the decode unit is to decode the instruction that is to have a field to indicate a size of the lanes of the result packed data.

Example 13 includes the processor of any one of Examples 1 to 11, in which it is to be implicit to the instruction to align each different non-overlapping set of the indicated number of adjoining data elements with the least significant end of the respective lane.

Example 14 is a method performed by a processor including receiving an instruction at the processor. The instruction indicating a source packed data that includes a plurality of adjoining data elements, the instruction indicating a number of data elements, and the instruction indicating a destination storage location. The method also includes storing a result packed data in the destination storage location in response to the instruction. The result packed data having a plurality of lanes. Each of the lanes of the result packed data storing a different non-overlapping set of the indicated number of adjoining data elements of the source packed data aligned with a least significant end of the respective lane. The different non-overlapping sets of the indicated number of the adjoining data elements in adjoining lanes of the result packed data separated from one another by at least one most significant data element position of the less significant lane.

Example 15 includes the method of Example 14, in which receiving includes receiving the instruction that has an immediate that indicates the number of the data elements. Also, optionally in which storing includes storing the result packed data having the plurality of lanes that are one of 128-bit lanes and 256-bit lanes.

Example 16 includes the method of any one of Examples 14 to 15, in which receiving includes receiving the instruction indicating the source packed data that includes a first array of multiple element structures and a second array of multiple element structures. Also, optionally in which storing includes storing the result packed data in which the first array of the multiple element structures is stored in a least significant lane of the result packed data and the second array of the multiple element structures is stored in an adjoining more significant lane of the result packed data with the at least one most significant data element position of the least significant lane separating the first array of the multiple element structures and the second array of the multiple element structures.

Example 17 includes the method of Example 14, in which receiving includes receiving the instruction indicating the source packed data that includes a first array of adjoining pairs of real and imaginary complex numbers and a second array of adjoining pairs of real and imaginary complex numbers. Also, optionally in which storing includes storing the result packed data in which the first array of the adjoining pairs of the real and the imaginary complex numbers is stored in a least significant lane of the result packed data and the second array of the adjoining pairs of the real and the imaginary complex numbers is stored in an adjoining more significant lane of the result packed data with at least two most significant data element positions of the least significant lane separating the first and second arrays of the adjoining pairs of the real and the imaginary complex numbers.

Example 18 includes the method of Example 14, in which receiving includes receiving the instruction indicating the source packed data that includes a first array of three adjoining pairs of 32-bit real and 32-bit imaginary complex numbers and a second array of three adjoining pairs of 32-bit real and 32-bit imaginary complex numbers. Also, optionally in which storing includes storing an at least 512-bit result packed data in which the first array of the three adjoining pairs of the 32-bit real and the 32-bit imaginary complex numbers is stored in a least significant 256-bit lane of the at least 512-bit result packed data and the second array of the three adjoining pairs of the 32-bit real and the 32-bit imaginary complex numbers is stored in an adjoining more significant 256-bit lane of the at least 512-bit result packed data with at least two most significant 32-bit data element positions of the least significant 256-bit lane separating the first and second arrays of the three adjoining pairs of the 32-bit real and the 32-bit imaginary complex numbers.

Example 19 includes the method of Example 14, in which receiving includes receiving the instruction indicating the source packed data that includes a first adjoining pair of 32-bit real and 32-bit imaginary complex numbers and a second adjoining pair of 32-bit real and 32-bit imaginary complex numbers. Also, optionally in which storing includes storing an at least 256-bit result packed data in which the first adjoining pair of the 32-bit real and the 32-bit imaginary complex numbers is stored in a least significant 128-bit lane of the at least 256-bit result packed data and the second adjoining pair of the 32-bit real and the 32-bit imaginary complex numbers is stored in an adjoining more significant 128-bit lane of the at least 256-bit result packed data with at least two most significant 32-bit data element positions of the least significant 128-bit lane separating the first and second adjoining pairs of the 32-bit real and the 32-bit imaginary complex numbers.

Example 20 includes the method of any one of Examples 14 to 19, in which receiving includes receiving the instruction that indicates the source packed data in system memory. Also further including optionally loading at least each of the different non-overlapping sets of the data elements from the system memory with a single load operation.

Example 21 includes the method of any one of Examples 14 to 19, in which storing includes storing the result in which each different non-overlapping set of the indicated number of the adjoining data elements being aligned with the least significant end of the respective lane is implicit to the instruction.

Example 22 is a computer system to process instructions including an interconnect, and a processor coupled with the interconnect. The processor to receive an instruction that is to indicate a source packed data that is to include a plurality of adjoining data elements, the instruction to indicate a number of data elements, and the instruction to indicate a destination packed data register. The processor, in response to the instruction, to store a result packed data in the destination packed data register, the result packed data to have a plurality of lanes. Each of the lanes of the result packed data to store a different non-overlapping set of the indicated number of adjoining data elements of the source packed data aligned with a least significant end of the respective lane. The different non-overlapping sets of the indicated number of the adjoining data elements in adjoining lanes of the result packed data to be separated from one another by at least one most significant data element position of the less significant lane. The computer system also includes a dynamic random access memory (DRAM) coupled with the interconnect. The DRAM storing a set of instructions of an algorithm. The set of the instructions of the algorithm is to expect the different non-overlapping sets of the indicated number of the adjoining data elements to be aligned with the least significant ends of the respective lanes.

Example 23 includes the computer system of any one of Examples 22, in which the processor is to store the result packed data in which the lanes are one of 128-bit lanes and 256-bit lanes.

Example 24 is an article of manufacture including a non-transitory machine-readable storage medium. The non-transitory machine-readable storage medium storing an instruction. The instruction to indicate a source packed data that is to include a plurality of adjoining data elements, the instruction to indicate a number of data elements, and the instruction to indicate a destination packed data register. The instruction if executed by a machine is to cause the machine to perform operations including store a result packed data in the destination packed data register. The result packed data to have a plurality of lanes. Each of the lanes of the result packed data to store a different non-overlapping set of the indicated number of adjoining data elements of the source packed data that are to be aligned with a least significant end of the respective lane. The different non-overlapping sets of the indicated number of the adjoining data elements in adjoining lanes of the result packed data to be separated from one another by at least one most significant data element position of the less significant lane.

Example 25 includes the article of manufacture of Example 24, in which the instruction is to have an immediate to indicate the number of the data elements. Also, optionally in which the lanes are to be one of 128-bit lanes and 256-bit lanes. Also, optionally in which it is to be implicit to the instruction to align each different non-overlapping set of the indicated number of adjoining data elements with the least significant end of the respective lane.

Example 26 includes the processor of any one of Examples 1 to 13, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 27 includes a system-on-chip that includes at least one interconnect, the processor of any one of Examples 1 to 13 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 14 to 21.

Example 29 is a processor or other apparatus that includes means for performing the method of any one of Examples 14 to 21.

Example 30 is a processor or other apparatus that includes any combination of modules and/or units and/or logic and/or circuitry and/or means operative to perform the method of any one of Examples 14 to 21.

Example 31 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 14 to 21.

Example 32 is a processor or other apparatus substantially as described herein.

Example 33 is a processor or other apparatus that is operative to perform any method substantially as described herein.

Example 34 is a processor or other apparatus that is operative to perform any partition into lanes instruction substantially as described herein.

Example 35 is a computer system or other electronic device that includes a processor having a decode unit operative to decode instructions of a first instruction set. The processor also has one or more execution units. The electronic device also includes a storage device coupled with the processor. The storage device is operative to store a first instruction, which may be any of the instructions substantially as disclosed herein, and which is to be of a second different instruction set. The storage device is also operative to store instructions to convert the first instruction into one or more instructions of the first instruction set. The one or more instructions of the first instruction set, when performed by the processor, are operative to cause the processor to store a result that would be stored by the first instruction (e.g., store any of the results of the instructions as described elsewhere herein).

What is claimed is:

1. A processor comprising:
   a plurality of packed data registers;
   a decode unit to decode an instruction, the instruction to indicate a source packed data that is to include a plurality of adjoining data elements, the instruction to indicate a number, and the instruction to indicate a destination storage location, wherein the plurality of adjoining data elements are floating point data elements; and
   an execution unit coupled with the plurality of packed data registers, and coupled with the decode unit, the execution unit, in response to the instruction, to store a result packed data in the destination storage location, the result packed data to have a plurality of lanes, each of the lanes of the result packed data to have a same size as one of the packed data registers which is at least 128 bits, each of the lanes of the result packed data to store a different non-overlapping set of the indicated number of the adjoining data elements of the source packed data aligned with a least significant end of the respective lane, the different non-overlapping sets of the indicated number of the adjoining data elements in adjoining lanes of the result packed data to be separated from one another by at least one most significant data element position of a less significant lane of the adjoining lanes.

2. The processor of claim 1, wherein the decode unit is to decode the instruction that is to have an immediate to indicate the number.

3. The processor of claim 1, wherein the decode unit is to decode the instruction that is to indicate the number through an indication of a number of structures that each are to include a same number of data elements.

4. The processor of claim 1, wherein the decode unit is to decode the instruction that is to indicate the source packed data in system memory, and wherein the execution unit, in response to the instruction, is to load at least each of the different non-overlapping sets of the adjoining data elements from the system memory with a single load operation.

5. The processor of claim 4, wherein the decode unit is to decode the instruction that is to indicate a mask that is to include a plurality of mask elements, and wherein the execution unit, in response to the instruction, is to load from the system memory only data elements of the source packed data that correspond to unmasked mask elements of the mask.

6. The processor of claim 1, wherein the decode unit is to decode the instruction that is to indicate the source packed data which is to include 32-bit single precision floating point data elements, and that is to indicate a 512-bit destination packed data register, and wherein the execution unit, in response to the instruction, is to store the result packed data, which is to be a 512-bit result packed data, and which is to have two 256-bit lanes, wherein each of the 256-bit lanes is to store the corresponding different non-overlapping set of the adjoining 32-bit single precision floating point data elements aligned with the least significant end of the respective 256-bit lane, wherein the different non-overlapping sets of the adjoining 32-bit single precision floating point data elements in the adjoining 256-bit lanes of the 512-bit result packed data are to be separated from one another by the at least one most significant 32-bit data element position of the less significant 256-bit lane.

7. The processor of claim 1, wherein the decode unit is to decode the instruction that is to indicate the source packed data which is to include 32-bit single precision floating point data elements, and that is to indicate an at least 256-bit destination packed data register, and wherein the execution unit, in response to the instruction, is to store the result packed data, which is to be an at least 256-bit result packed data, and which is to have at least two 128-bit lanes, wherein each of the at least two 128-bit lanes is to store the corresponding different non-overlapping set of the adjoining 32-bit single precision floating point data elements aligned with the least significant end of the respective 128-bit lane, wherein the different non-overlapping sets of the adjoining 32-bit single precision floating point data elements in the adjoining 128-bit lanes of the at least 256-bit result packed data are to be separated from one another by the at least one most significant 32-bit data element position of the less significant 128-bit lane.

8. The processor of claim 1, wherein the instruction allows the number to be three, and wherein the decode unit is to decode the instruction that is to indicate the source packed data that is to include 32-bit single precision floating point data elements.

9. The processor of claim 1, wherein the instruction allows the number to be six, and wherein the decode unit is to decode the instruction that is to indicate the source packed data that is to include 64-bit double precision floating point data elements.

10. The processor of claim 1, wherein the execution unit, in response to the instruction, is to store the result packed data in which each of the plurality of lanes of the result packed data is a 128-bit lane.

11. The processor of claim 1, wherein the execution unit, in response to the instruction, is to store the result packed data in which each of the plurality of lanes of the result packed data is a 256-bit lane.

12. The processor of claim 1, wherein the decode unit is to decode the instruction that is to have a field to indicate a size of the plurality of lanes of the result packed data.

13. The processor of claim 1, wherein it is to be implicit to the instruction to align each different non-overlapping set of the indicated number of the adjoining data elements with the least significant end of the respective lane.

14. A method performed by a processor, the method comprising:
receiving an instruction at the processor, the instruction indicating a source packed data that includes a plurality of adjoining floating point data elements, the instruction indicating a number, and the instruction indicating a destination storage location; and
storing a result packed data in the destination storage location in response to the instruction, the result packed data having a plurality of lanes, each of the lanes of the result packed data to have a same size as a size of an architectural packed data register of the processor which is at least 128 bits, each of the lanes of the result packed data storing a different non-overlapping set of the indicated number of the adjoining floating point data elements of the source packed data in a packed data format of the processor aligned with a least significant end of the respective lane, the different non-overlapping sets of the indicated number of the adjoining floating point data elements in adjoining lanes of the result packed data separated from one another by at least one most significant data element position of a less significant lane of the adjoining lanes.

15. The method of claim 14, wherein receiving comprises receiving the instruction that has an immediate that indicates the number, and wherein storing comprises storing the result packed data having the plurality of lanes that are one of 128-bit lanes and 256-bit lanes.

16. The method of claim 14, wherein receiving comprises receiving the instruction indicating the source packed data that includes a first array of multiple-element structures and a second array of multiple-element structures, and wherein storing comprises storing the result packed data in which the first array of the multiple-element structures is stored in a least significant lane of the result packed data and the second array of the multiple-element structures is stored in an adjoining more significant lane of the result packed data with the at least one most significant data element position of the least significant lane separating the first array of the multiple-element structures and the second array of the multiple-element structures.

17. The method of claim 14, wherein receiving comprises receiving the instruction indicating the source packed data that includes a first array of adjoining pairs of real and imaginary complex numbers and a second array of adjoining pairs of real and imaginary complex numbers, and wherein storing comprises storing the result packed data in which the first array of the adjoining pairs of the real and the imaginary complex numbers is stored in a least significant lane of the result packed data and the second array of the adjoining pairs of the real and the imaginary complex numbers is stored in an adjoining more significant lane of the result packed data with at least two most significant data element positions of the least significant lane separating the first and second arrays of the adjoining pairs of the real and the imaginary complex numbers.

18. The method of claim 14, wherein receiving comprises receiving the instruction indicating the source packed data that includes a first array of three adjoining pairs of 32-bit real and 32-bit imaginary complex numbers and a second array of three adjoining pairs of 32-bit real and 32-bit imaginary complex numbers, and wherein storing comprises storing an at least 512-bit result packed data in which the first array of the three adjoining pairs of the 32-bit real and the 32-bit imaginary complex numbers is stored in a least significant 256-bit lane of the at least 512-bit result packed data and the second array of the three adjoining pairs of the 32-bit real and the 32-bit imaginary complex numbers is stored in an adjoining more significant 256-bit lane of the at least 512-bit result packed data with at least two most significant 32-bit data element positions of the least significant 256-bit lane separating the first and second arrays of the three adjoining pairs of the 32-bit real and the 32-bit imaginary complex numbers.

19. The method of claim 14, wherein receiving comprises receiving the instruction indicating the source packed data that includes a first adjoining pair of 32-bit real and 32-bit imaginary complex numbers and a second adjoining pair of 32-bit real and 32-bit imaginary complex numbers, and wherein storing comprises storing an at least 256-bit result packed data in which the first adjoining pair of the 32-bit real and the 32-bit imaginary complex numbers is stored in a least significant 128-bit lane of the at least 256-bit result packed data and the second adjoining pair of the 32-bit real and the 32-bit imaginary complex numbers is stored in an adjoining more significant 128-bit lane of the at least 256-bit result packed data with at least two most significant 32-bit data element positions of the least significant 128-bit lane separating the first and second adjoining pairs of the 32-bit real and the 32-bit imaginary complex numbers.

20. The method of claim 14, wherein the instruction allows the number to be three, and wherein receiving comprises receiving the instruction that indicates the source packed data in system memory, and further comprising loading at least each of the different non-overlapping sets of the adjoining floating point data elements from the system memory with a single load operation.

21. The method of claim 14, wherein the number is six, and wherein storing comprises storing the result packed data in which each different non-overlapping set of the indicated number of the adjoining floating point data elements being aligned with the least significant end of the respective lane is implicit to the instruction.

22. A computer system to process instructions, the computer system comprising:
   an interconnect;
   a processor coupled with the interconnect, the processor having a plurality of packed data registers that each have at least 128 bits, the processor to receive a first instruction that is to indicate a source packed data that is to include a plurality of adjoining data elements, the first instruction to indicate a number that the instruction allows to be three, and the first instruction to indicate a destination packed data register, the processor, in response to the first instruction, to store a result packed data in the destination packed data register, the result packed data to have a plurality of lanes, each of the lanes of the result packed data having a same size as one of the packed data registers, each of the lanes of the result packed data to store a different non-overlapping set of the indicated number of the adjoining data elements of the source packed data in a packed data format of the processor aligned with a least significant end of the respective lane, the different non-overlapping sets of the indicated number of the adjoining data elements in adjoining lanes of the result packed data to be separated from one another by at least one most significant data element position of a less significant lane of the adjoining lanes, wherein the plurality of adjoining data elements of the source packed data are floating point data elements, and wherein the processor is to store the result packed data in which each of the plurality of lanes of the result packed data are one of 128-bit lanes and 256-bit lanes; and
   a dynamic random access memory (DRAM) coupled with the interconnect, the DRAM storing a first set of instructions of an algorithm, the first set of instructions of the algorithm written based on the different non-overlapping sets of the indicated number of the adjoining data elements being aligned with the least significant ends of the respective lanes.

23. An article of manufacture comprising a non-transitory machine-readable storage medium, the non-transitory machine-readable storage medium storing an instruction,
   the instruction to indicate a source packed data that is to include a plurality of adjoining floating point data elements, the instruction to indicate a number, and the instruction to indicate a destination packed data register, and the instruction, if executed by a machine, is to cause the machine to perform operations, to:
   generate a result packed data; and
   store the result packed data in the destination packed data register, the result packed data to have a plurality of lanes, each of the lanes of the result packed data to have a same size as a size of an architectural packed data register of the machine which is at least 128 bits, each of the lanes of the result packed data to store a different non-overlapping set of the indicated number of the adjoining data elements of the source packed data in a packed data format of the machine aligned with a least significant end of the respective lane, the different non-overlapping sets of the indicated number of the adjoining data elements in adjoining lanes of the result packed data to be separated from one another by at least one most significant data element position of a less significant lane of the adjoining lanes.

24. The article of manufacture of claim 23, wherein the instruction is to have an immediate to indicate the number, wherein each of the plurality of lanes of the result packed data is to be one of 128-bit lanes and 256-bit lanes, and wherein it is to be implicit to the instruction to align each different non-overlapping set of the indicated number of the adjoining data elements with the least significant end of the respective lane.

\* \* \* \* \*